(12) United States Patent
Lin

(10) Patent No.: US 8,269,721 B2
(45) Date of Patent: Sep. 18, 2012

(54) THREE-DIMENSIONAL MOUSE APPARATUS

(76) Inventor: Ming-Yen Lin, Taipei (TW)

( * ) Notice: Subject to any disclaimer, the term of this patent is extended or adjusted under 35 U.S.C. 154(b) by 1168 days.

(21) Appl. No.: 12/117,124

(22) Filed: May 8, 2008

(65) Prior Publication Data

US 2008/0278447 A1    Nov. 13, 2008

(30) Foreign Application Priority Data

May 8, 2007   (TW) ............................... 96116210 A
Nov. 21, 2007 (TW) ............................... 96144022 A

(51) Int. Cl.
*G09G 3/033* (2006.01)
(52) U.S. Cl. ........................................ 345/158; 345/163
(58) Field of Classification Search ............ 345/156–184
See application file for complete search history.

(56) References Cited

U.S. PATENT DOCUMENTS

| | | | | |
|---|---|---|---|---|
| 5,488,204 | A * | 1/1996 | Mead et al. ................. | 178/18.06 |
| 5,675,437 | A * | 10/1997 | Hart et al. ..................... | 359/566 |
| 6,573,883 | B1 * | 6/2003 | Bartlett ......................... | 345/156 |
| 6,844,871 | B1 * | 1/2005 | Hinckley et al. .............. | 345/163 |
| 7,889,179 | B2 * | 2/2011 | Tseng ............................ | 345/167 |
| 2005/0093824 | A1 * | 5/2005 | Hinckley et al. .............. | 345/163 |
| 2005/0116947 | A1 * | 6/2005 | Lovberg et al. ............... | 345/418 |
| 2005/0156915 | A1 * | 7/2005 | Fisher .......................... | 345/179 |
| 2005/0202869 | A1 * | 9/2005 | Miyamoto et al. ............. | 463/36 |
| 2005/0212749 | A1 * | 9/2005 | Marvit et al. ................. | 345/156 |
| 2008/0122788 | A1 * | 5/2008 | Sirtori .......................... | 345/158 |
| 2008/0228438 | A1 | 9/2008 | Lin | |
| 2008/0259355 | A1 | 10/2008 | Lin | |
| 2010/0214214 | A1 * | 8/2010 | Corson et al. ................. | 345/158 |

OTHER PUBLICATIONS

Corson, Gregory; Remote Input Device; Date published: Nov. 2006 (Nov. 30, 2006); pp. 1-71.*
Ming-Yen Lin, Method of Recognizing and Tracking Multiple Spatial Points, U.S. Appl. No. 12/105,630, Apr. 18, 2008.
Ming-Yen Lin, Method of Recognizing and Tracking a Spatial Point, U.S. Appl. No. 12/047,159, Mar. 12, 2008.

* cited by examiner

*Primary Examiner* — Amare Mengistu
*Assistant Examiner* — Joseph G Rodriguez
(74) *Attorney, Agent, or Firm* — WPAT, PC; Justin King

(57) ABSTRACT

A 3D mouse apparatus is disclosed in the present invention. The apparatus is mainly utilized to calculate, recognize, analyze and output the 3D gestures which include the physical quantity such as 3D position coordinate, displacement, velocity and acceleration of a point light source and the moving behavior of human hand, so as to achieve the purpose of 3D mouse apparatus.

17 Claims, 18 Drawing Sheets

US 8,269,721 B2

THREE-DIMENSIONAL MOUSE APPARATUS

BACKGROUND OF THE INVENTION

1. Field of the Invention

The present invention relates to a 3D mouse apparatus, and more particularly to an apparatus comprising a point light source device which is installed on human hands or fingers and a 3D gesture reading and recognizing device is utilized to calculate, analyze, recognize and output the 3D gestures which include the physical quantities such as 3D position coordinate, displacement, velocity, and acceleration of the point light source device and the moving behavior of human hand, so as to achieve the purpose of 3D mouse apparatus.

2. Description of the Related Art

The conventional mouse, as one of the well known personal computer's peripheral, is manipulated on a 2D plane to achieve the operation of free movement, pressing button, depressing button, single clicking, double clicking, and dragging via the mechanical structure of button and the manipulation of hand and fingers, so as to achieve the purpose of operating a computer. Therefore, the conventional mouse can be treated as a simple 2D gesture recognizing apparatus. However, due to the limitation of performance, the conventional mouse is not able to provide 3D position coordinate and 3D gestures. Therefore, the conventional mouse is no way to satisfy the demand for more complicated software operations which require much and more complicated man-machine interface. Additionally, there is an inevitable drawback that the hands and fingers may suffer from great fatigue caused by a long-time operation of the conventional mouse.

SUMMARY OF THE INVENTION

In view of the disadvantages of the prior art, the present invention provides a 3D mouse apparatus for recognizing more diversified and more complicated 3D gestures and eliminating the possible hand fatigue due to the long-time operation.

Therefore, the primary object of the present invention is to provide a 3D mouse apparatus and take advantage of a point light source device attachable to a hand or fingers, a three 1D optical lens system, and a gesture analysis process, so as to achieve the replacement purpose of the conventional mouse and satisfy the demand for more complicated man-machine interface which requires more diversified and complicated 3D gestures. Since the hand or the finger can arbitrarily move in the free 3D space, thus the fatigue of hand or wrist muscle can be avoided. The optical structure, the fundamental optical theory, and the definition of all parameters used by the present invention are recited in details in the R.O.C. Pat. Application Nos. 096108692 and 096113579 or U.S. patent application Ser. Nos. 12/047,159 and 12/105,630, so that the fundamentals are not described again here, and only the characteristics related to the present invention are described as follows.

BRIEF DESCRIPTION OF THE DRAWINGS

The present invention will become readily understood from the detailed description given herein below and the accompanying drawings which are given by way of illustration only, and thus are not limitative of the present invention and wherein.

DESCRIPTION OF THE EXEMPLARY EMBODIMENTS

Figure 1:
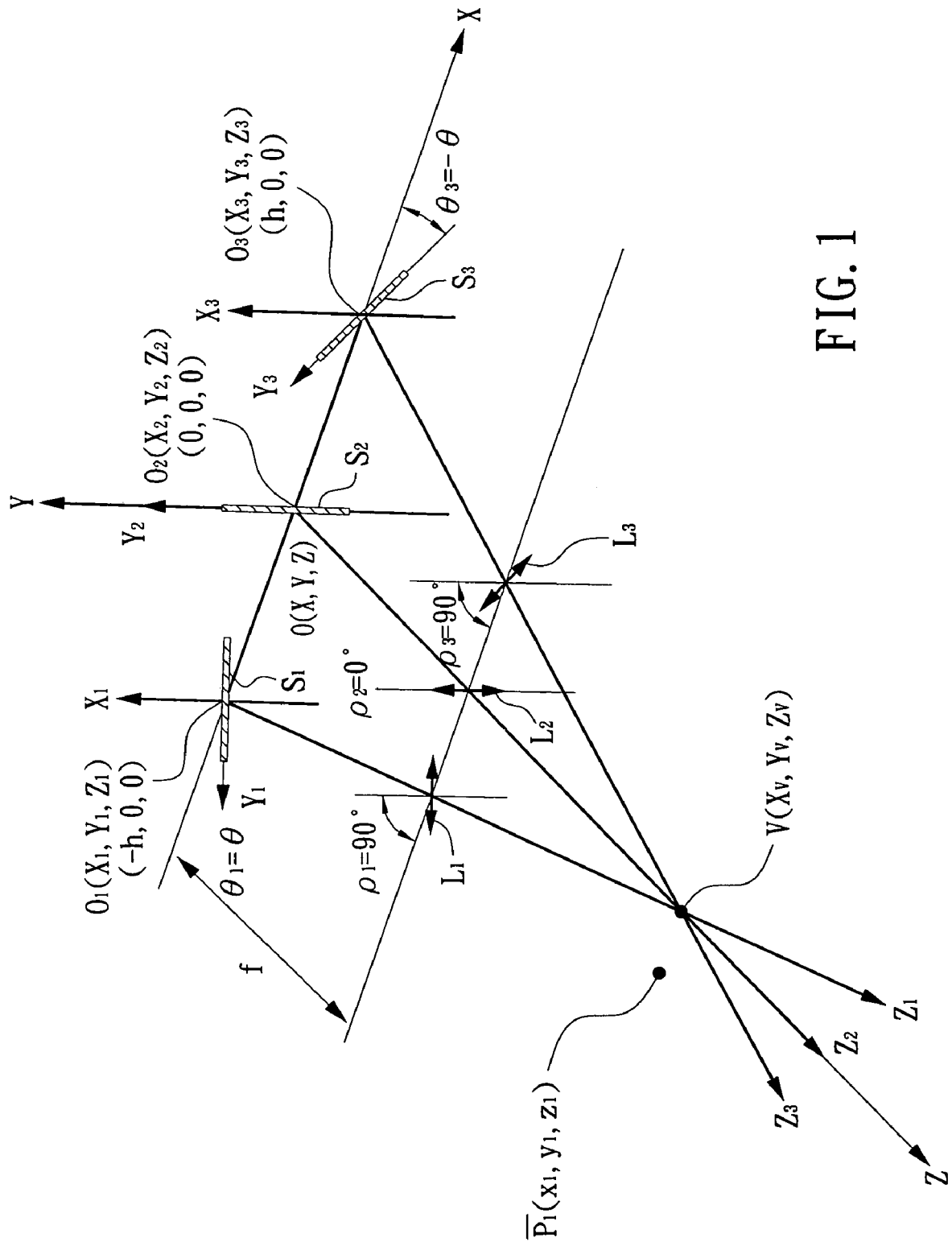
FIG. 1 shows the schematic view of the optical system disclosed in the embodiment of the present invention.

As depicted by FIG. 1, the composition of the optical system disclosed in the embodiment of the present invention is shown. With respect to world coordinate system $O(X,Y,Z)$, namely, visual space, there exists an arbitrarily movable single point light source $\overline{P}_1(x_1,y_1,z_1)$ with an arbitrary wavelength and an 1D optical system. The 1D optical system according to the embodiment of the present invention, is principally composed of three 1D focusing optical lens $L_1 L_2 L_3$, and said $L_1 L_2 L_3$ respectively has a corresponding focus length $f_j$ ($1 \leq j \leq 3$) different from or identical to each other. To simplify the figure, only the case of identical focus length f is shown. For the world coordinate system, the origins of three arbitrarily rotatory image coordinate systems $O_1(X_1, Y_1, Z_1)$ $O_2(X_2,Y_2,Z_2)$ $O_3(X_3,Y_3,Z_3)$, are disposed and affixed at $(-h,0,0)$ $(0,0,0)$ $(h,0,0)$. At the initial state, the axis of $X_j$ $Y_j$ $Z_j$ ($1 \leq j \leq 3$) of three image coordinate systems $O_1(X_1,Y_1,Z_1)$ $O_2(X_2,Y_2,Z_2)$ $O_3(X_3,Y_3,Z_3)$ are parallel to the axis of X Y Z of the world coordinate system $O(X,Y,Z)$.

Under three image coordinate systems $O_1(X_1,Y_1,Z_1)$ $O_2(X_2,Y_2,Z_2)$ $O_3(X_3,Y_3,Z_3)$, three 1D focusing optical lens $L_1L_2L_3$ are respectively installed and affixed at (0,0,f), namely the position f along $Z_j$ axis, and the focusing direction of each lens is set parallel to the $Y_j$ axis. Additionally, a strip-typed 1D image sensor $S_1S_2S_3$ is installed and affixed at the origins of three image coordinate systems $O_1(X_1,Y_1,Z_1)$ $O_2(X_2,Y_2,Z_2)$ $O_3(X_3,Y_3,Z_3)$ and comprises M×1 sensing pixels. The direction of the sensor's longer axis is set parallel to the focusing direction of the 1D focusing optical lens $L_1L_2L_3$ respectively. However, if another optical lens module is added at the back side of 1D focusing optical lens $L_1L_2L_3$ to amend the phenomenon of aberration that causes 90 degrees of image rotation, the direction of the longer axis of $S_1S_2S_3$ is then set perpendicular to the direction of the 1D focusing optical lens $L_1L_2L_3$ respectively. Since their principal optical characteristics are the same, the following description will no longer mention the case of the 90-degree rotation.

Also, the angle of the world coordinate system O(X,Y,Z) rotated with respect to the axis of X, Y, Z is respectively set to be $\Theta=0°$ $\Phi=0°$ $\Omega=0°$. Namely, in the present invention, the world coordinate system O(X,Y,Z) is fixed and the coordinate system is devoid of angular rotation.

Further, the three image coordinate systems $O_1(X_1,Y_1,Z_1)$ $O_2(X_2,Y_2,Z_2)$ $O_3(X_3,Y_3,Z_3)$ can be rotated through an angle of $\theta_j$ about the axis of $Y_j$ respectively, and can be rotated through an angle of $\rho_j$ about the axis of $Z_j$ respectively. Therefore, the image coordinate system $O_j(X_j,Y_j,Z_j)$ is rotated through the angle of $\theta_j$ $\rho_j$, namely, the 1D focusing optical lens $L_j$ and the 1D sensor $S_j$ are rotated simultaneously. This results in, regardless the aforementioned angular rotation, the relative angle between the focusing directions of the 1D focusing optical lens $L_j$ and the direction of the longer axis of the 1D sensor $S_j$ remains the same. Hereby, the angular rotations of three image coordinate systems $O_1(X_1,Y_1,Z_1)$ $O_2(X_2,Y_2,Z_2)$ $O_3(X_3,Y_3,Z_3)$ are set to be $\theta_1=\theta$ $\theta_2=0°$ $\theta_3=-\theta$ $\rho_1=90°$ $\rho_2=0°$ $\rho_3=90°$, wherein $\theta \geqq 0°$. Therefore, when $\theta \neq 0°$, the $Z_1$ $Z_2$ $Z_3$ of $O(X_1,Y_1,Z_1)$ $O_2(X_2,Y_2,Z_2)$ $O_3(X_3,Y_3,Z_3)$ are intersected at one point $V(X_V,Y_V,Z_V)$, namely, convergent point.

Additionally, within the three image coordinate systems $O_1(X_1,Y_1,Z_1)$ $O_2(X_2,Y_2,Z_2)$ $O_3(X_3,Y_3,Z_3)$, let the coordinate of the point light source $P_1(x_1,y_1,z_1)$ be $(x_{oj}, y_{oj}, z_{oj})$ and the coordinate transformation relation is specified as follows:

$$\begin{pmatrix} x_1 \\ y_1 \\ z_1 \end{pmatrix} = R_j(\Theta=0°, \Phi=0°, \theta_j, \rho_j) \begin{pmatrix} x_{oj} \\ y_{oj} \\ z_{oj} \end{pmatrix} + \begin{pmatrix} h_{xj} \\ h_{yj} \\ h_{zj} \end{pmatrix} \quad (1)$$

where, $1 \leqq j \leqq 3$ and $$R_j(\Theta=0°, \Phi=0°, \theta_j, \rho_j) = \begin{pmatrix} \cos\theta_j\cos\rho_j & -\cos\theta_j\sin\rho_j & \sin\theta_j \\ \sin\rho_j & \cos\rho_j & 0 \\ -\sin\theta_j\cos\rho_j & \sin\theta_j\sin\rho_j & \cos\theta_j \end{pmatrix} \quad (2)$$

While $(h_{xj}, h_{yj}, h_{zj})$ describes the coordinate of the origin of the three image coordinate systems $O_1(X_1,Y_1,Z_1)$ $O_2(X_2,Y_2,Z_2)$ $O_3(X_3,X_3,Z_3)$ set in the world coordinate system O(X,Y,Z). Additionally, According to equation (1), equation (3) can be obtained as follows, $$\begin{pmatrix} x_{oj} \\ y_{oj} \\ z_{oj} \end{pmatrix} = r_j(\Theta=0°, \Phi=0°, \theta_j, \rho_j) \left[ \begin{pmatrix} x_1 \\ y_1 \\ z_1 \end{pmatrix} - \begin{pmatrix} h_{xj} \\ h_{yj} \\ h_{zj} \end{pmatrix} \right] \quad (3)$$

where, $$r_j(\Theta=0°, \Phi=0°, \theta_j, \rho_j) = \begin{pmatrix} \cos\rho_j\cos\theta_j & \sin\rho_j & -\cos\rho_j\sin\theta_j \\ -\sin\rho_j\cos\theta_j & \cos\rho_j & \sin\rho_j\sin\theta_j \\ \sin\theta_j & 0 & \cos\theta_j \end{pmatrix} \quad (4)$$

Substitute Equation (4) into Equation (3) to obtain Equation (5) as follows:

$$\begin{pmatrix} x_{oj} \\ y_{oj} \\ z_{oj} \end{pmatrix} =$$

$$\begin{pmatrix} \cos\rho_j\cos\theta_j(x_1-h_{xj}) + \sin\rho_j(y_1-h_{yj}) - \cos\rho_j\sin\theta_j(z_1-h_{zj}) \\ -\sin\rho_j\cos\theta_j(x_1-h_{xj}) + \cos\rho_j(y_1-h_{yj}) + \sin\rho_j\sin\theta_j(z_1-h_{zj}) \\ \sin\theta_j(x_1-h_{xj}) + \cos\theta_j(z_1-h_{zj}) \end{pmatrix} \quad (5)$$

Thus, for the point light source located at $(x_{oj}, y_{oj}, z_{oj})$ in the three image coordinate systems, the coordinate of its corresponding axial point light source is $(0, y_{oj}, z_{oj})$. Additionally the line image position of the axial point light source $(0, y_{oj}, z_{oj})$ is situated at $(0, y_{sj}, 0)$, and their geometric optical relation is given below:

$$y_{oj} = -\frac{z_{oj}-f}{f} y_{sj} \quad (6)$$

Substitute Equation (5) into Equation (6) to obtain Equation (7) as follows:

$$(y_{sj}\sin\theta_j - f\sin\rho_j\cos\theta_j)x_1 + f\cos\rho_j y_1 + (f\sin\rho_j\sin\theta_j + y_{sj}\cos\theta_j)z_1 = (h_{sj}\sin\theta_j + h_{zj}\cos\theta_j + f)y_{sj} - h_{xj}f\sin\rho_j\cos\theta_j + h_{yj}f\cos\rho_j + h_{zj}f\sin\theta_j \quad (7)$$

Additionally, the parameters such as the rotating angle and the origin coordinate of each image coordinate system are assigned as follows:

$$\theta_1=\theta;\ \theta_2=0°;\ \theta_3=-\theta;\ \rho_1=90°;\ \rho_2=0°;\ \rho_3=90°; \quad (8)$$

$$h_{x1}=-h;\ h_{x2}=0;\ h_{x3}=h;\ h_{y1}=h_{y2}=h_{y3}=0;\ h_{z1}=h_{z2}=h_{z3}=0 \quad (9)$$

Substitute Equations (8) and (9) into Equation (7) to obtain Equations (10), (11) and (12) as follows:

$$(y_{s1}\sin\theta - f\cos\theta)x_1 + (f\sin\theta + y_{s1}\cos\theta)z_1 = (-h\sin\theta+f)y_{s1} + hf\cos\theta \quad (10)$$

$$fy_1 + y_{s2}z_1 = y_{s2}f \quad (11)$$

$$(y_{s3}\sin\theta + f\cos\theta)x_1 + (f\sin\theta - y_{s3}\cos\theta)z_1 = (h\sin\theta-f)y_{s3} + hf\cos\theta \quad (12)$$

According to Equations (10) and (12), the following solution can be obtained:

$$z_1 = \frac{2\sin\theta(f - h\sin\theta)y_{s1}y_{s3} + f(f\cos\theta - h\sin 2\theta)(y_{s1} - y_{s3}) + 2hf^2\cos^2\theta}{(y_{s1}y_{s3} + f^2)\sin 2\theta + f(\cos^2\theta - \sin^2\theta)(y_{s1} - y_{s3})} \quad (13)$$

Therefore, substitute Equation (13) into Equations (10) and (11), the solutions of $x_1$、$y_1$ can be obtained.

Additionally, let $\theta=0°$, then Equations (10), (11) and (12) become:

$$-fx_1+y_{s1}z_1=fy_{s1}=hf \quad (14)$$

$$fy_1+y_{s2}z_1=y_{s2}f \quad (15)$$

$$fx_1-y_{s3}z_1=-fy_{s3}+hf \quad (16)$$

According to Equations (14), (15) and (16), the solutions of $x_1$、$y_1$、$z_1$ can be obtained as follows:

$$x_1 = \frac{y_{s1} + y_{s3}}{y_{s1} - y_{s3}}h \quad (17)$$

$$y_1 = -\frac{2h}{y_{s1} - y_{s3}}y_{s2} \quad (18)$$

$$z_1 = \left(1 + \frac{2h}{y_{s1} - y_{s3}}\right)f \quad (19)$$

Figure 2:
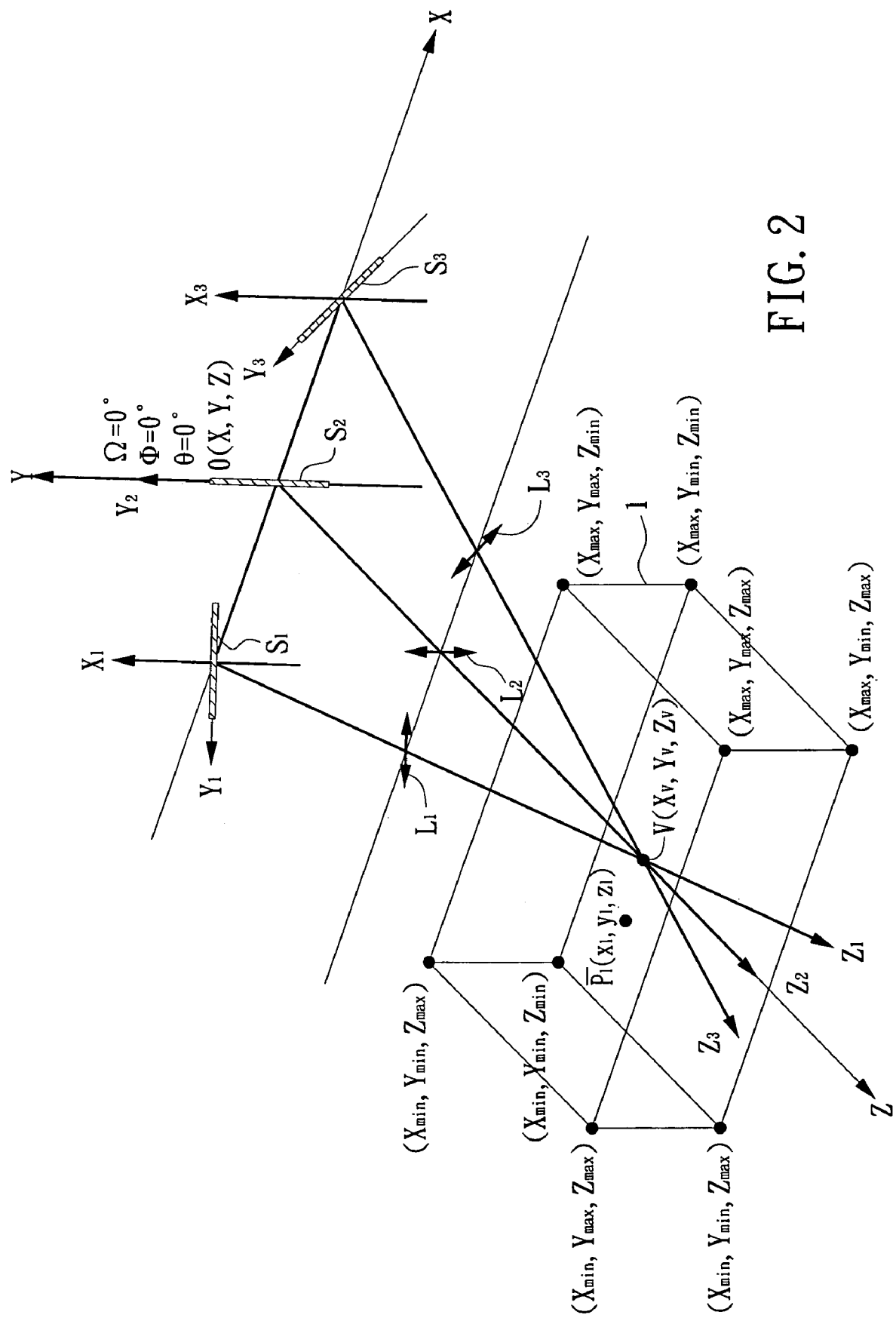
FIG. 2 shows the schematic view of the object point space disclosed in the embodiment of the present invention.

As depicted by FIG. 2, the composition of the object point space disclosed in the embodiment of the present invention is shown.

Since $\Theta=0°$、$\Phi=0°$、$\Omega=0°$ are assigned and the world coordinate system $O(X, y, Z)$ is fixed without any rotation at any angle, therefore, the function of object tracking is not allowed in the present invention. Besides, due to the limited length of light sensible zone in the 1D image sensors $S_1, S_2, S_3$, the maximum movable range for the point source $\overline{P}_1(x_1,y_1,z_1)$ is limited within the range of $X_{min}\leq x_1\leq X_{max}$、$Y_{min}\leq y_1\leq Y_{max}$、$Z_{min}\leq z_1\leq Z_{max}$, and this limited region is named as a detectable zone, or hereinafter called an object point space 1. The center point of the object point space 1 is disposed at the convergent point $V(X_V,Y_V,Z_V)$, so as to achieve the most effective optical imaging transformation.

Figure 3:
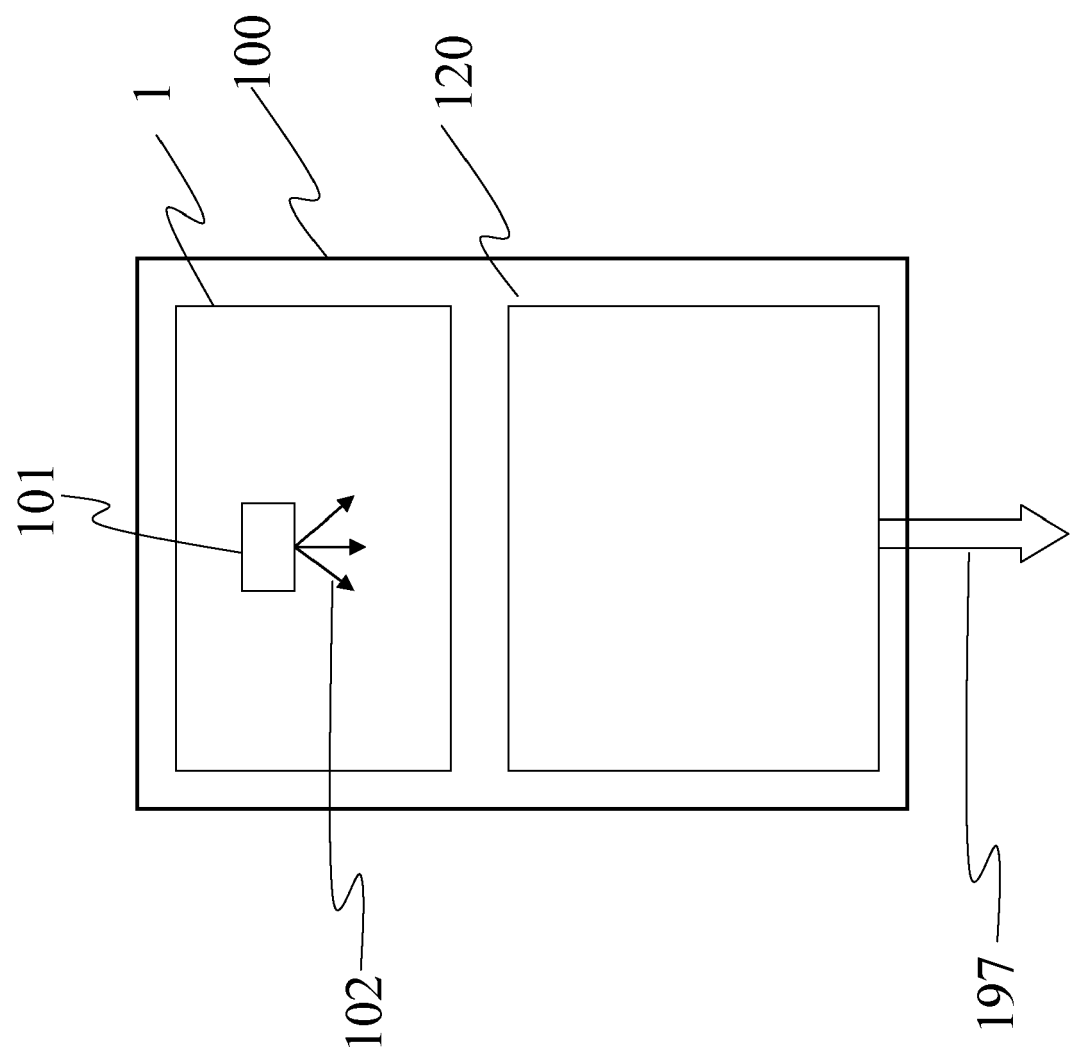
FIG. 3 shows the schematic view of the system disclosed in the embodiment of the present invention.

As depicted in FIG. 3, the composition of the system disclosed in the embodiment of the present invention is shown.

A 3D mouse apparatus 100, comprises a point light source device 101, a 3D gesture reading and recognizing device 120, and an object point space 1. The point light source device 101, is mainly formed by a point light source for emitting a scattered light with arbitrary wavelength, and can be an active point light source for emitting a scattered light 102 or can be a passive point light source for reflecting a scattered light 102. Besides, the point light source device 101 can be installed on the hands or fingers to transmit the moving behavior of hand to the 3D gesture reading and recognizing device 120. The device 120 receives the scattered light 102 emitted by the point light source device 101 and can periodically calculate, analyze, and output a 3D gesture signal 197 in a fixed time period. In addition, the object point space 1 is a maximal movable range for the point light source device 101, and the center point of the object point space 1 is set at the convergent point $V(X_V,Y_V,Z_V)$.

Figure 4:
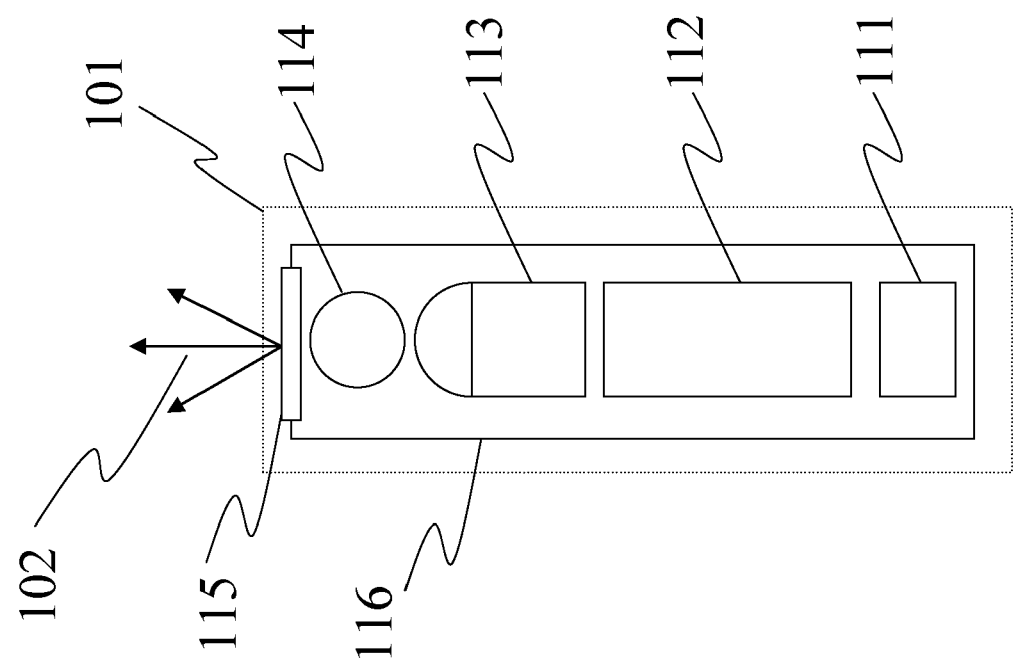
FIG. 4 shows the schematic view of the active point light source device disclosed in the embodiment of the present invention.

As depicted in FIG. 4, the composition of the active point light source device disclosed in the embodiment of the present invention is shown.

The active point light source device 101 disclosed in the present invention is composed of a power control circuit 111, a battery 112, an illuminating element 113, an optical scattering element 114, a pin-hole 115, and a mechanical device 116. The power control circuit 111 comprising an electronic control circuit and a switch is connected to the battery 112 and the illuminating element 113 for controlling the power supply of the battery 112 and the brightness of the illuminating element 113. The battery 112 provides the electricity to the illuminating element 113 and the power control circuit 111. The illuminating element 113 can be one or a plurality of semiconductor laser diodes or LEDs for emitting a visible light or a non-visible light. The optical scattering element 114, composed of a spherical lens with a short focus length, receives and focuses the light emitted by the illuminating element 113, and outputs a scattered light with a larger divergent angle. The pin-hole device 115, which is an optical element with a small round aperture, is disposed at the focal plane of the optical scattering element 114. By properly adjusting the size of the aperture, the scattered light deviated from the focus point can be appropriately eliminated, so as to produce a scattering light source which is close to a point light source. Furthermore, the mechanical device 116 is used for affixing the power control circuit 111, the battery 112, the illuminating element 113, the optical scattering element 114, and the pin-hole 115.

Figure 5:
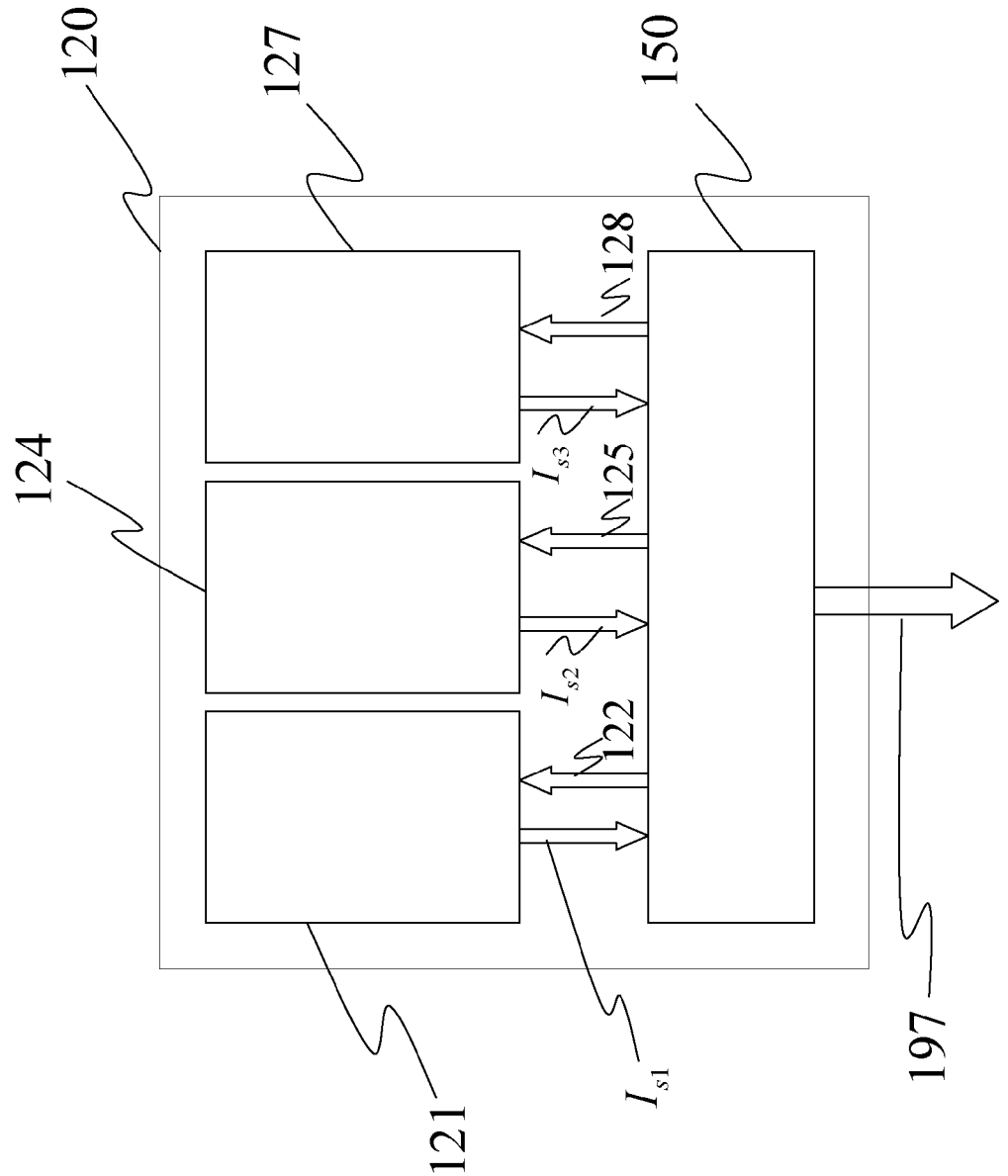
FIG. 5 shows the schematic view of the 3D gesture reading and recognizing device disclosed in the embodiment of the present invention.

As depicted in FIG. 5, the composition of the 3D gesture reading and recognizing device disclosed in the embodiment of the present invention is shown.

The 3D gesture reading and recognizing device 120 is composed of three sets of 1D optical imaging device 121, 124, 127 and a gesture analysis device 150.

The three sets of 1D optical imaging device 121, 124, 127 output an image pixel position signals $I_{s1}$、$I_{s2}$、$I_{s3}$ respectively after receiving the scattered light 102 from the point light source device 101. In addition, synchronous control signals 122, 125, 128 are received to drive the scanning process of the three 1D optical imaging devices synchronously. The image pixel position signals $I_{s1}$、$I_{s2}$、$I_{s3}$ and synchronous control signals 122, 125, 128 can be transmitted via wireless transmission or a cable. Also, the three sets of 1D optical imaging device are disposed at an equal distance h along a straight line, and the angle of disposition is assigned to $\theta_1=\theta$、$\theta_3=0°$、$\theta_3=-\theta$、$\varphi_1=90°$、$\varphi_2=0°$、$\varphi_3=90°$, where $\theta\geq 0°$.

The gesture analysis device 150 calculates, analyzes, recognizes and outputs a 3D gesture signal 197 in a fixed time period after receiving the image pixel position signals $I_{s1}$、$I_{s2}$、$I_{s3}$. The signal 197 can be transmitted by a wireless transmission or a cable. In addition, the gesture analysis device 150 can output synchronous control signals 122, 125, 128 simultaneously to drive the scanning process of the three 1D optical imaging device 121, 124, 127 synchronously.

Figure 6:
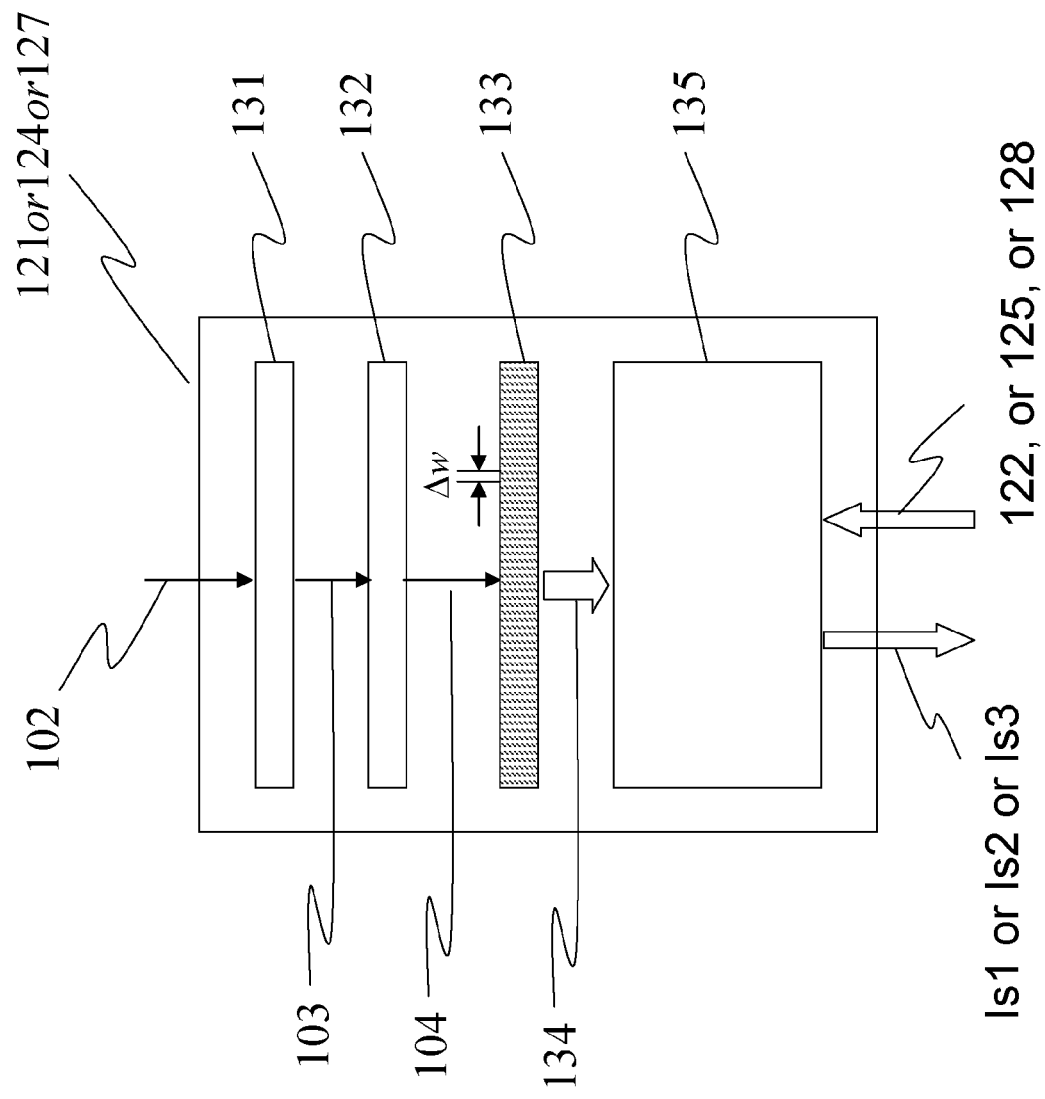
FIG. 6 shows the schematic view of the three sets of 1D optical imaging device disclosed in the embodiment of the present invention.

As depicted in FIG. 6, the composition of the three sets of 1D optical imaging device disclosed in the embodiment of the present invention is shown.

The three 1D optical imaging device 121, 124, 127 share the common structure and comprise an optical filtering element 131, a 1D optical lens module 132, a 1D optical image sensor 133, and an image reading and processing device 135.

The optical filtering element 131 receives the scattered light 102 from the point light source device 101, and outputs a scattered light 103 after reducing the background light The 1D optical lens module 132 is composed of an optical lens capable of performing a 1D focus. The optical axis of the 1D optical lens module 132 is disposed at the axis $Z_j$ of the image coordinate system, and the focusing direction is set parallel to the axis $Y_j$ of the image coordinate system. The 1D optical lens module 132 transforms the scattered light 103 into a stripe typed beam 104 which is focused to form a line image on the 1D optical image sensor 133. Furthermore, the directions of the longer axis of the stripe typed beam 104 is perpendicular to the longer axis of the 1D optical image sensor 133.

The 1D optical image sensor 133, composed of M×1 pixels with a pixel width $\Delta_w$, is used for receiving the stripe typed beam 104 and individually outputting the image pixel signals 134 from the first pixel to the M-th pixel by an analog voltage, wherein the center of the sensor 133 is disposed at the origin of the image coordinate system and its longer axis is set parallel to the $Y_j$ axis of the image coordinate system.

Furthermore, the image reading and processing device 135 is a microcomputer system which comprises a microprocessor, a memory, a scanning circuit, an ADC, and a Fourier image processing procedure. The image reading and processing device 135 is used for acquiring the image pixel signal 134 which is scanned and saved periodically by the scanning circuit and said ADC, so as to achieve the purpose of the scanning process. The image reading and processing device 135 is also used for outputting the image pixel position signal $I_{s1}$、$I_{s2}$、$I_{s3}$ which is analyzed and obtained by the Fourier image processing procedure after the image pixel signal 134 is recorded in the memory. The Fourier image processing procedure is used to eliminate the background light and analyze and obtain the brightest pixel position in the image pixel signal 134, and the brightest pixel position is the image pixel position signal $I_{s1}$、$I_{s2}$、$I_{s3}$. Additionally, the image reading and processing device 135 receives a synchronous control signal 122, 125, 128 which is used to synchronously driving the scanning process so that said image pixel signal 134 can be fetched synchronously by the three sets of 1D optical imaging device 121, 124, 127.

Figure 7:
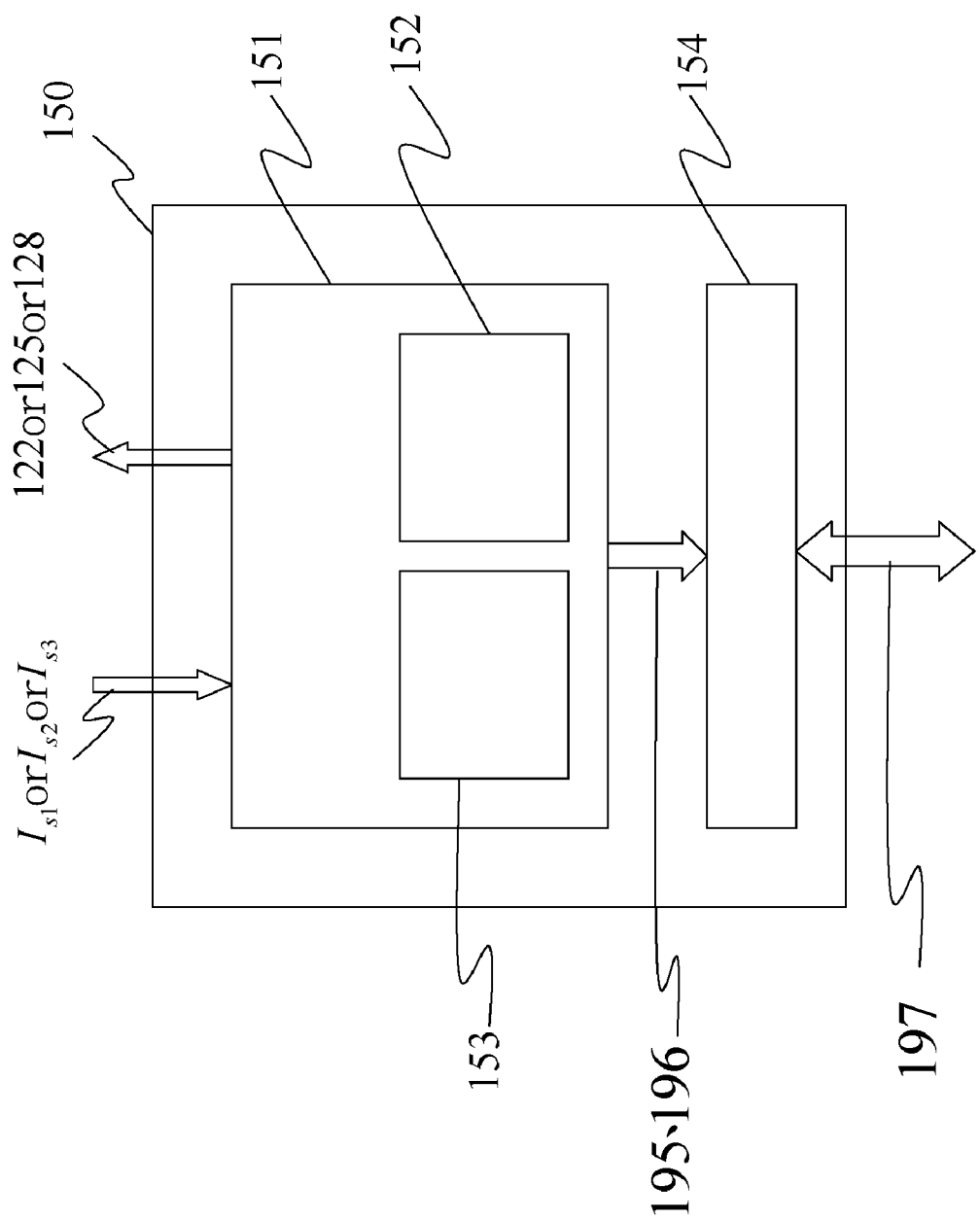
FIG. 7 shows the schematic view of the gesture analysis device disclosed in the embodiment of the present invention.

As depicted in FIG. 7, the composition of the gesture analysis device disclosed in the embodiment of the present invention is shown.

The gesture analysis device 150 disclosed in the present invention comprises a microcomputer system 151 and an interface 154. The microcomputer system 151 comprises a microprocessor, a memory, an error correction process 152 stored in the memory and a gesture analyzing process 153 stored in the memory. The microcomputer system 151 periodically outputs a physical quantity signal 195, such as the 3D position coordinates, displacement, velocity, and acceleration of the point light source device 101, and a gesture signal 196, such as the pressing button, releasing button, single clicking button, double clicking button and dragging used by the conventional mouse's operation, at an equal time interval. Both the physical quantity signal 195 and gesture signal 196 are calculated and analyzed by the error correction process 152 and gesture analyzing process 153 after receiving the three image pixel position signals $I_{s1}$、$I_{s2}$、$I_{s3}$.

The interface 154 can be a generic standard interface, such as USB, which is used for receiving the physical quantity signal 195 and gesture signal 196, and converting both signals 195, 196 into the 3D gesture signal 197 and outputting the 3D gesture signal 197. Additionally, the gesture analysis device 150 simultaneously outputs a synchronous control signal 122, 125, 128 to drive the three 1D optical imaging device 121, 124, 127 simultaneously, so as to achieve the purpose of reading the image pixel signal 134 synchronously.

Figure 8:
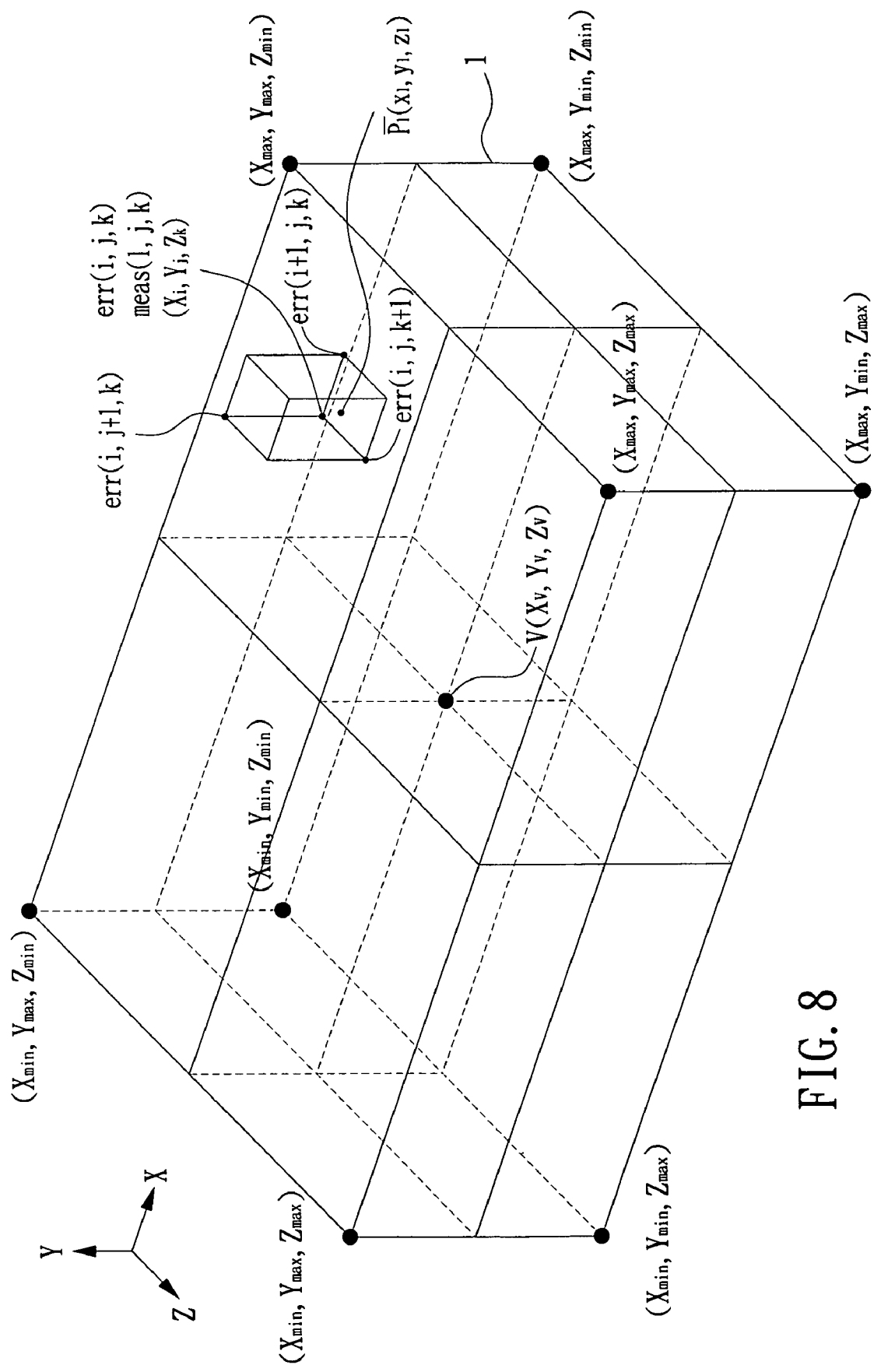
FIG. 8 relates to the schematic view of the error correction process disclosed in the embodiment of the present invention.

As depicted in FIG. 8, the schematic view of the error correction process disclosed in the embodiment of the present invention is shown.

The error correction process disclosed in the present invention is a 3D interpolation correction. Firstly, a space division of equivalent sub-space (l, m, n) is applied to the object point space 1 as follows:

$$X_i = \Delta X \times i + X_{min} \tag{20}$$

where, $$\Delta X = \frac{X_{max} - X_{min}}{l},$$

l=integer, $0 \leq i < l$ $$Y_j = \Delta Y \times j + Y_{min} \tag{21}$$

where, $$\Delta Y = \frac{Y_{max} - Y_{min}}{m},$$

m=integer, $0 \leq j < m$ $$Z_k = \Delta Z \times k + Z_{min} \tag{22}$$

where, $$\Delta Z = \frac{Z_{max} - Z_{min}}{n},$$

n=integer, $0 \leq k < n$

Then, by applying a coordinate measurement to the point light source device 101 which is set at a known position $(X_i, Y_j, Z_k)$ in the object point space 1, the coordinate meas(i, j, k)=$(X_i + \delta X_i, Y_j + \delta Y_j, Z_k + \delta Z_k)$ is measured and obtained, wherein $(\delta X_i, \delta Y_j, \delta Z_k)$ is the error value, and both measured coordinate meas(i, j, k) and error value $(\delta X_i, \delta Y_j, \delta Z_k)$ are saved in the memory. Furthermore, in the practical operation, the position $P_1(x_1, y_1, z_1)$ of the point light source device 101 can be measured and the corresponding error can be corrected as follows:

Firstly, the measured coordinate $(x_1, y_1, z_1)$ of the point light source device 101 in the actual operation is corresponded to a proper sub-space division according to following calculations:

$$X_i + \delta X_i \leq x_1 < X_{i+1} + \delta X_{i+1} \tag{23}$$

$$Y_j + \delta Y_j \leq y_1 < Y_{j+1} + \delta Y_{j+1} \tag{24}$$

$$Z_k + \delta Z_k \leq z_1 < Z_{k+1} + \delta Z_{k+1} \tag{25}$$

Then, the corrected coordinate $(X_1, Y_1, Z_1)$ is obtained according to the value of meas(i, j, k) and err(i, j, k), and following calculations of interpolation:

$$X_1 = X_i + \frac{\Delta X}{\Delta X + (\delta X_{i+1} - \delta X_i)} \times [x_1 - (X_i + \delta X_i)] \tag{26}$$

$$Y_1 = Y_j + \frac{\Delta Y}{\Delta Y + (\delta Y_{j+1} - \delta Y_j)} \times [y_1 - (Y_j + \delta Y_j)] \tag{27}$$

$$Z_1 = Z_k + \frac{\Delta Z}{\Delta Z + (\delta Z_{k+1} - \delta Z_k)} \times [z_1 - (Z_k + \delta Z_k)] \tag{28}$$

Figure 9:
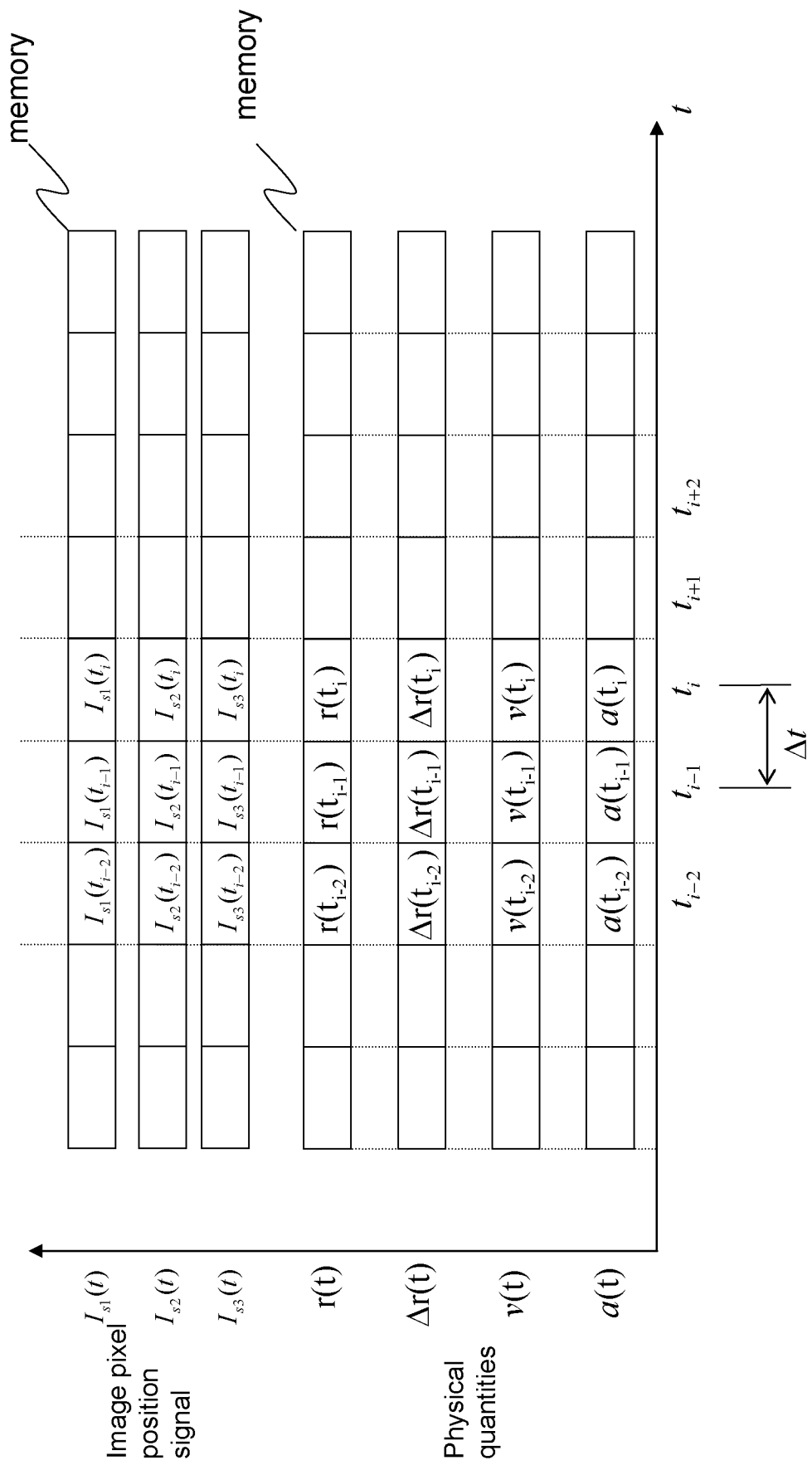
FIG. 9 shows the memory allocations of the physical quantity disclosed in the embodiment of the present invention.

As depicted in FIG. 9, the memory allocations of the physical quantity disclosed in the embodiment of the present invention is shown.

The calculation of the physical quantity disclosed in the embodiment of the present invention such as 3D position coordinate r(t) 、3D displacement Δr(t) 、3D velocity v(t) 、and 3D acceleration a(t) are calculated and recorded after reading and recording the image pixel position signal $I_{s1}(t)$ 、$I_{s2}(t)$ 、$I_{s3}(t)$ at an equivalent time interval Δt. In FIG. 9, only the parameters and physical quantities recorded and calculated at the time $t=t_i$ 、$t=t_{i-1}$ 、$t=t_{i-2}$ are shown, wherein $t=t_i$ is the present time. The time interval Δt is the total time required for acquiring all image pixel signals 134 (hereinafter refer as line scanning time), which is the total time for reading all M×1 image pixel signals or integral times of the line scanning time n×Δt, where n is a configurable integer. Thus, the calculation of all physical quantities (hereby, only the calculation at n=1 is shown) as follows:

The corrected 3D coordinate $r(t)=(X_1(t_i), Y_1(t_i), Z_1(t_i))$ is calculated as follows:

First of all, the line image coordinate $y_{sj}$ is calculated, where $1 \leq j \leq 3$, $$y_{s1}(t_i)=(I_{s1}(t_i)-I_0) \times \Delta w \quad (29)$$

$$y_{s2}(t_i)=(I_{s2}(t_i)-I_0) \times \Delta \omega \quad (30)$$

$$y_{s3}(t_i)=(I_{s3}(t_i)-I_0) \times \Delta \omega \quad (31)$$

where $I_0$ is the position of the center pixel of the 1D optical image sensor 133, and Δw is the pixel width which describes the spatial interval between the center of two adjacent pixels. Additionally, the position coordinate $r(t)=(X_1(t_i), Y_1(t_i), Z_1(t_i))$ after error correction can be calculated according to equations (10~13) or (17~19), and (23~28). The calculation of displacement $\Delta r(t)=(\Delta X_1(t_i), \Delta Y_1(t_i), \Delta Z_1(t_i))$ is set to be:

$$\Delta X_1(t_i)=X_1(t_i)-X_1(t_{i-1}) \quad (32)$$

$$\Delta Y_1(t_i)=Y_1(t_i)-Y_1(t_{i-1}) \quad (33)$$

$$\Delta Z_1(t_i)=Z_1(t_i)-Z_1(t_{i-1}) \quad (34)$$

And, the calculation of the velocity $v(t)=(v_x(t_i), v_y(t_i), v_z(t_i))$, is set to be:

$$v_x(t_i) = \frac{\Delta X_1(t_i)}{\Delta t} \quad (35)$$

$$v_y(t_i) = \frac{\Delta Y_1(t_i)}{\Delta t} \quad (36)$$

$$v_z(t_i) = \frac{\Delta Z_1(t_i)}{\Delta t} \quad (37)$$

And, the calculation of the acceleration $a(t)=(a_x(t_i), a_y(t_i), a_z(t_i))$, is set to be:

$$a_x(t_i) = \frac{v_x(t_i)-v_x(t_{i-1})}{\Delta t} \quad (38)$$

$$a_y(t_i) = \frac{v_y(t_i)-v_y(t_{i-1})}{\Delta t} \quad (39)$$

$$a_z(t_i) = \frac{v_z(t_i)-v_z(t_{i-1})}{\Delta t} \quad (40)$$

Accordingly, by using the physical quantities defined above and some conditions of the consecutive physical state, the general gesture can be defined and recognized. Also, a specific gesture corresponded to the operation of conventional mouse can be defined and recognized, so as to achieve the emulating purpose of the conventional mouse's operations. A more detailed description is shown as follows:

For the single point light source moving freely in the 3D space, how to define and recognize a meaningful gesture from the arbitrary movement of the single point light source is the most important topic for the gesture recognition. Hereby, we firstly define a general gesture and then use the general gestures to define the gestures for mouse operations.

Definition of General Gestures

Figure 10A:
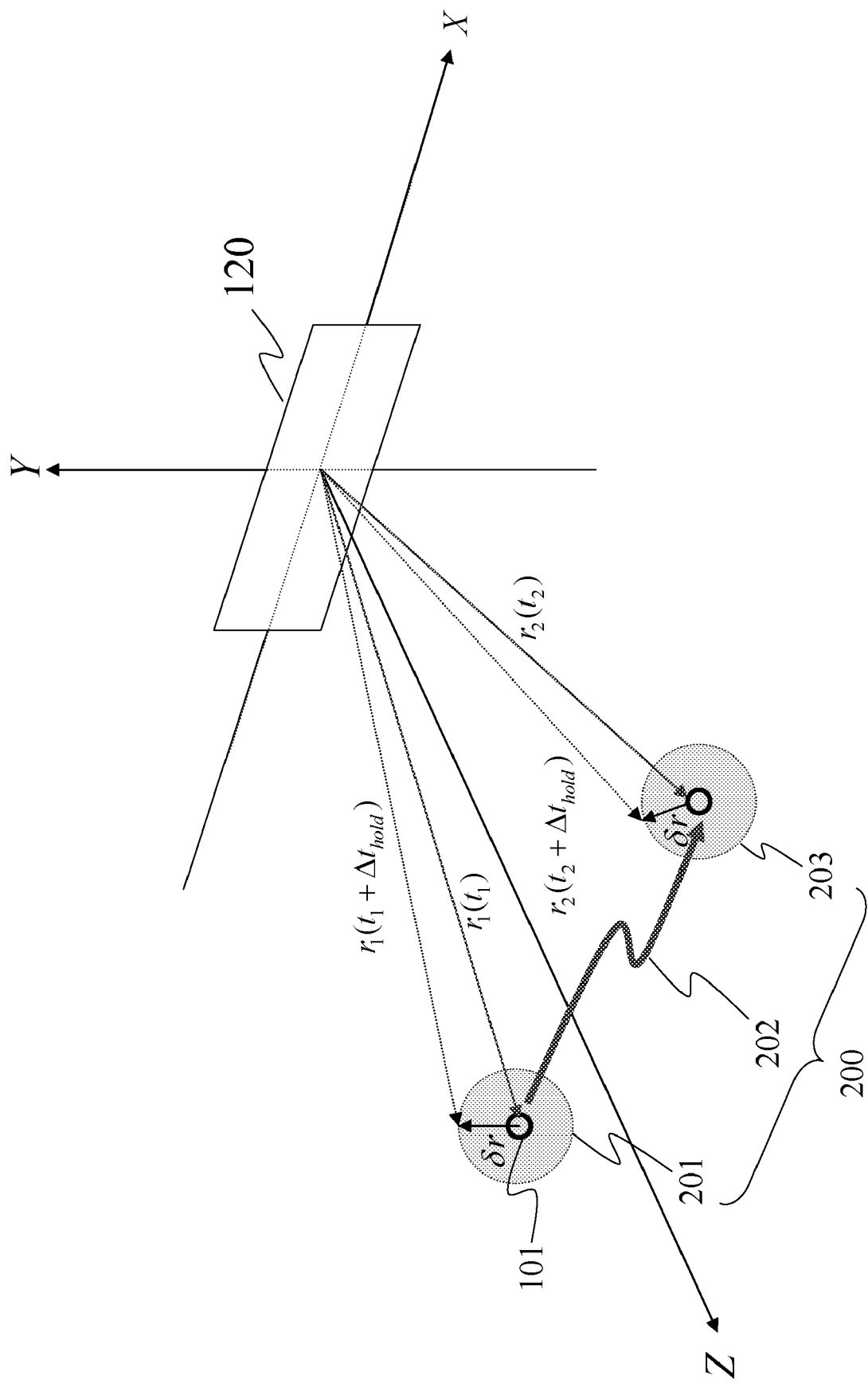
FIG. 10(a) shows the schematic view of the general gesture definition disclosed in the embodiment of the present invention.

As depicted in FIG. 10(a), the schematic view of the general gesture disclosed in the embodiment of the present invention is shown.

In the present invention, the general gesture is defined as the composition of a plurality of consecutive gesture units, wherein the single general gesture unit 200 is composed of three consecutive physical states such as a temporary hold state 1 (201), a specific movement state 2 (202) and a temporary hold state 3 (203). The definition of the temporary hold state 1 (201) stands for a state that the spot light source device 101, within the time frame of $t_1 \leq t_1 \leq t_1+\Delta t_{hold}$, maintains still, namely $|r_1(t)-r_1(t_1)|<\delta r$, where $\Delta t_{hold}$ 、δr are a variable, relatively small, but larger-than-zero values. As to the definition of another temporary hold state 3 (203), it is identical to the state 1 (201) with the different time frame and spot location. Namely, the spot light source device 101 located at $r_2(t)$, within the time frame of $t_2 \leq t \leq t_2+\Delta t_{hold}$, maintains the still state of $|r_2(t)-r_2(t_2)|<\delta r$.

Figure 10B:
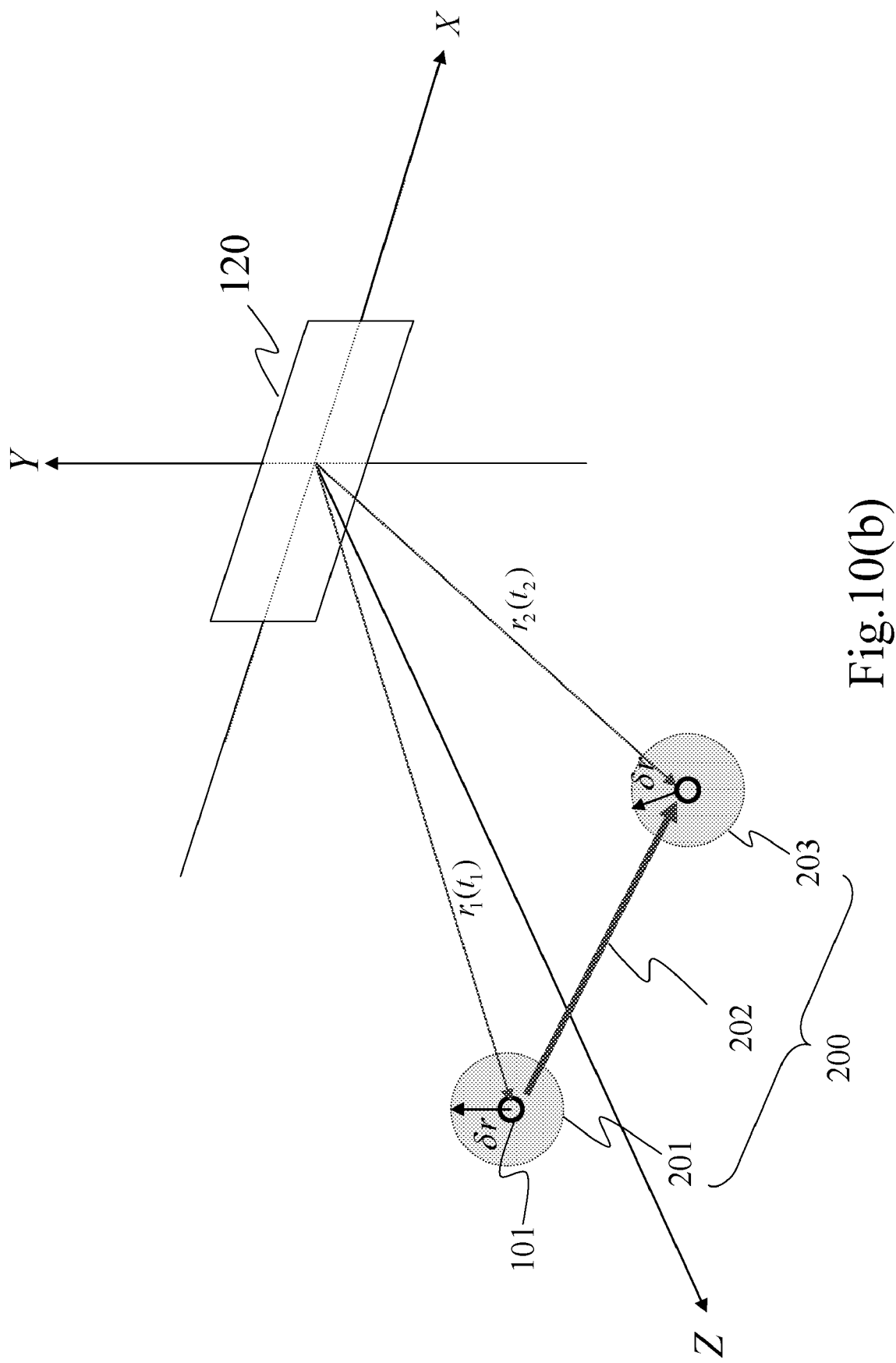
FIG. 10(b) shows the schematic view of the general straight-line gesture definition disclosed in the embodiment of the present invention.
Figure 10C:
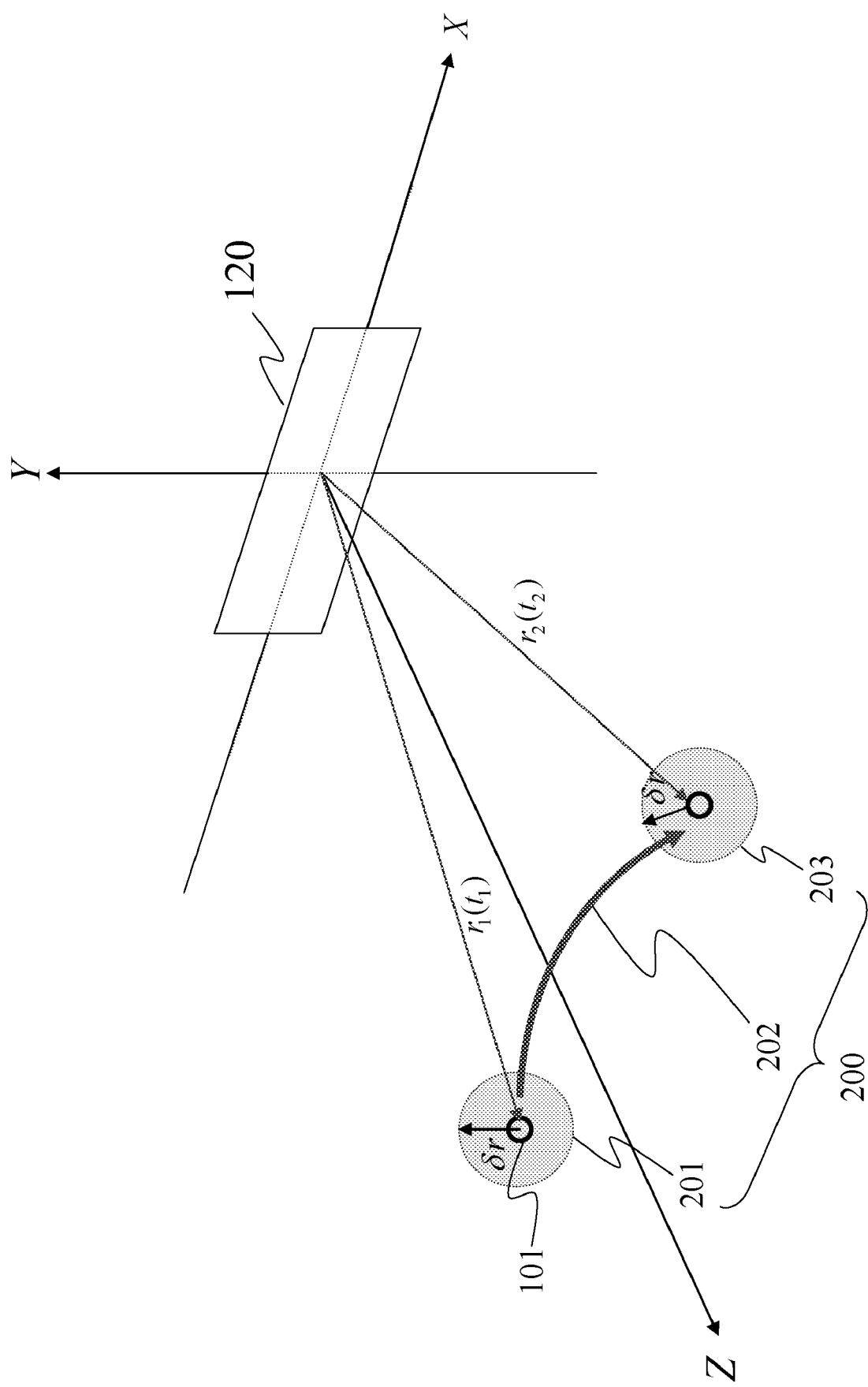
FIG. 10(c) shows the schematic view of the general curve gesture definition disclosed in the embodiment of the present invention.
Figure 10D:
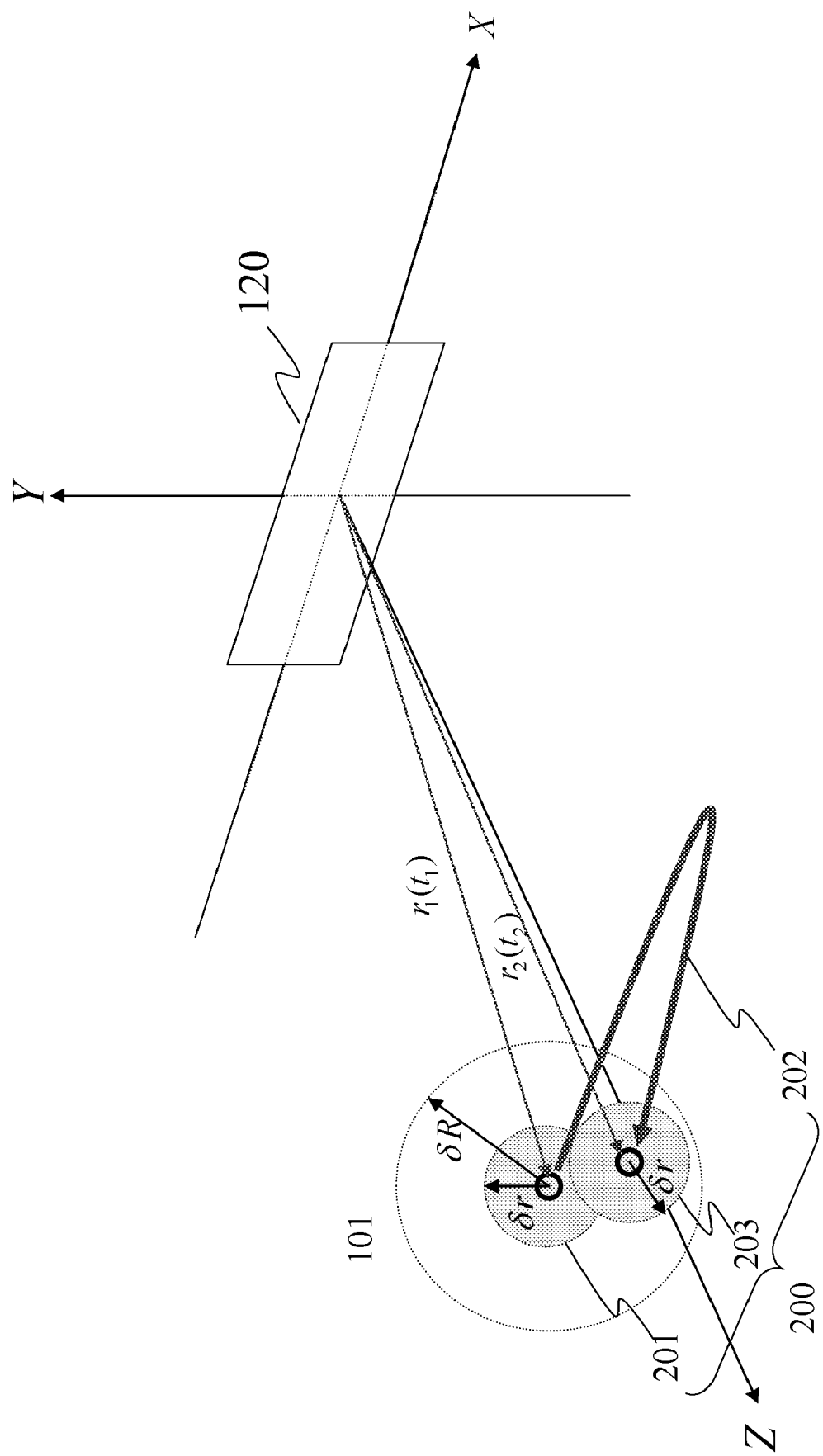
FIG. 10(d) shows the schematic view of the general back-and-forth gesture definition disclosed in the embodiment of the present invention.

The specific movement state 2 (202) can be defined as the spot light source device 101, within the time frame of $t_1+\Delta t_{hold}<t<t_2$, moving from state 1 (201) to the state 3 (203) by the specific movement state. For instance, the specific movement state can be a straight-line movement (as depicted in FIG. 10(b)) or a curve movement (as depicted in FIG. 10(c)) or a back-and-forth movement (as depicted in FIG. 10(d)). Thus, all movement states except the aforementioned movement are defined as an arbitrary movement in the present invention and do not belong to any sort of meaningful gesture.

As depicted in FIG. 10(b), the schematic view of the general straight-line gesture definition disclosed in the embodiment of the present invention is shown.

As the aforementioned definition of the gesture, the general straight-line gesture can be defined as being composed of three consecutive physical states such as a temporary hold state 1 (201), a straight-line movement state 2 (202), and a temporary hold state 3 (203). The definition of the straight-line movement state 2 (202) stands for a state that the spot light source device 101, within the time frame of $t_1+\Delta t_{hold} \leq t \leq t_2$, moves from $r_1(t_1)$ to $r_2(t_2)$ substantially along a path which is approximate to a straight-line.

As depicted by FIG. 10(c), the schematic view of the general curve gesture definition disclosed in the embodiment of the present invention is shown.

As the aforementioned definition of the gesture, the general curve gesture can be defined as being composed of three consecutive physical states such as a temporary hold state 1 (201), a curve movement state 2 (202), and a temporary hold state 3 (203). The definition of the curve movement state 2 (202) stands for a state that the spot light source device 101, within the time frame of $t_1+\Delta t_{hold} \leq t \leq t_2$, moves from $r_1(t_1)$ to $r_2(t_2)$ substantially along a path which is approximate to a curve. The curve can be a curve of second order polynomial such as an arc, a parabolic, an ellipse or a curve of higher order polynomial.

As depicted by FIG. 10(d), the schematic view of the general back-and-forth gesture definition disclosed in the embodiment of the present invention is shown.

As the aforementioned definition of the gesture, the general back-and-forth gesture can be defined as being composed of three consecutive physical states such as a temporary hold state 1 (201), a back-and-forth movement state 2 (202), and a temporary hold state 3 (203). The definition of the back-and-forth movement state 2 (202) stands for a state that the spot light source device 101, within the time frame of $t_1+\Delta t_{hold} \leq t \leq t_2$, moves from $r_1(t_1)$ to $r_2(t_2)$ substantially in a straight line or a curve, and satisfies the condition of $|r_2(t_2)-r_1(t_1)|<\delta R$ where $\delta R$ is a variable, relatively small, but larger-than-zero values and $\delta R > \delta r$.

Gestures for Emulating the Mouse Operation

Figure 11A:
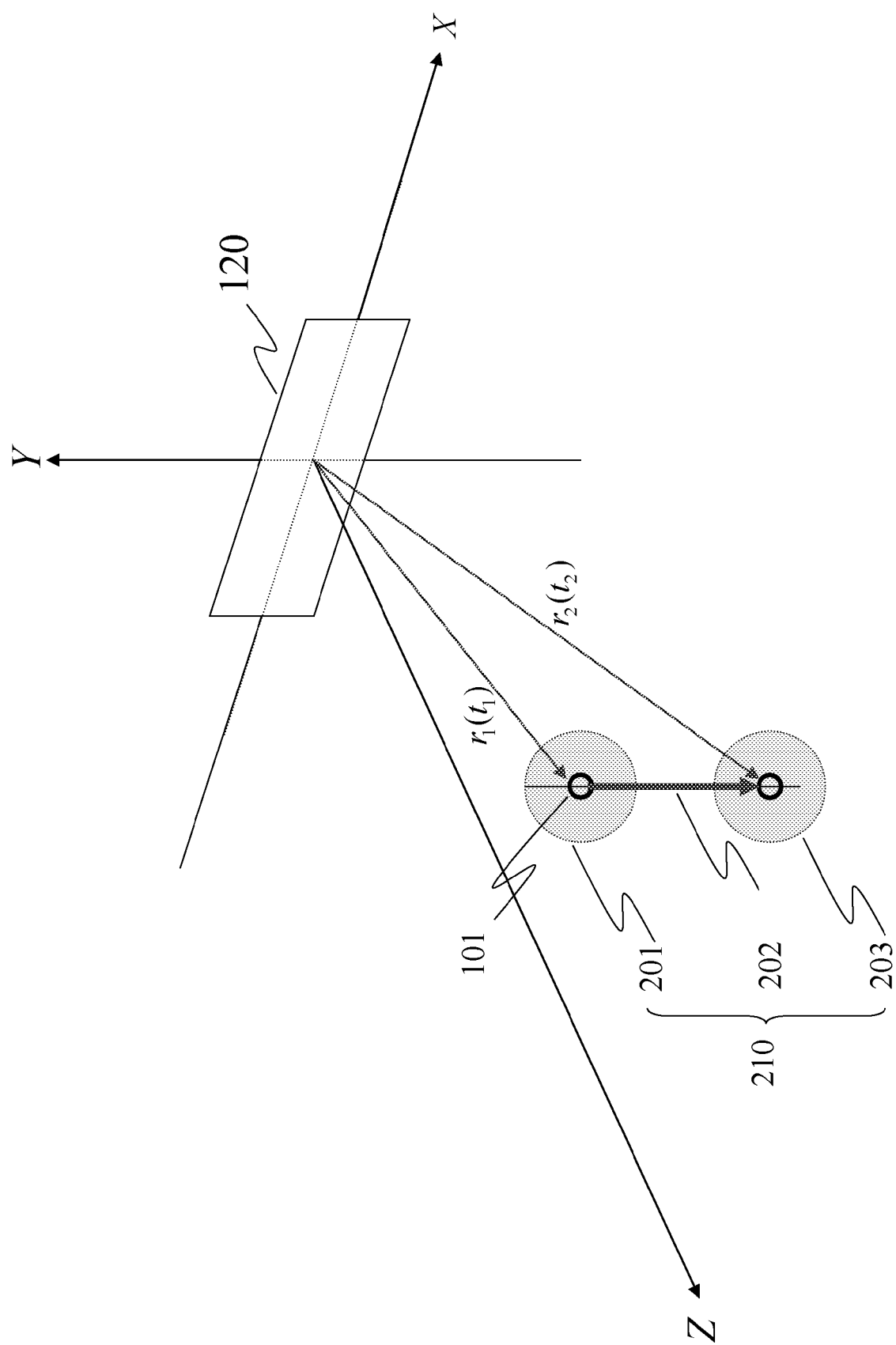
FIG. 11(a), shows the schematic view of a pressing button gesture used to emulate the mouse operation disclosed in the embodiment of the present invention.

As depicted in FIG. 11(a), the schematic view of a pressing button gesture used to emulate the mouse operation disclosed in the embodiment of the present invention is shown. The pressing button gesture 210 can be defined as being composed of three consecutive physical states such as a temporary hold state 1 (201), a straight-line movement state 2 (202), and a temporary hold state 3 (203). The definition of the straight-line movement state 2 (202) stands a short straight-line movement from the top to the bottom and satisfies a condition $|r_2(t_2)-r_1(t_1)|<\Delta L$ where $\Delta L$ is a variable and relatively small but larger-than-zero value.

Figure 11B:
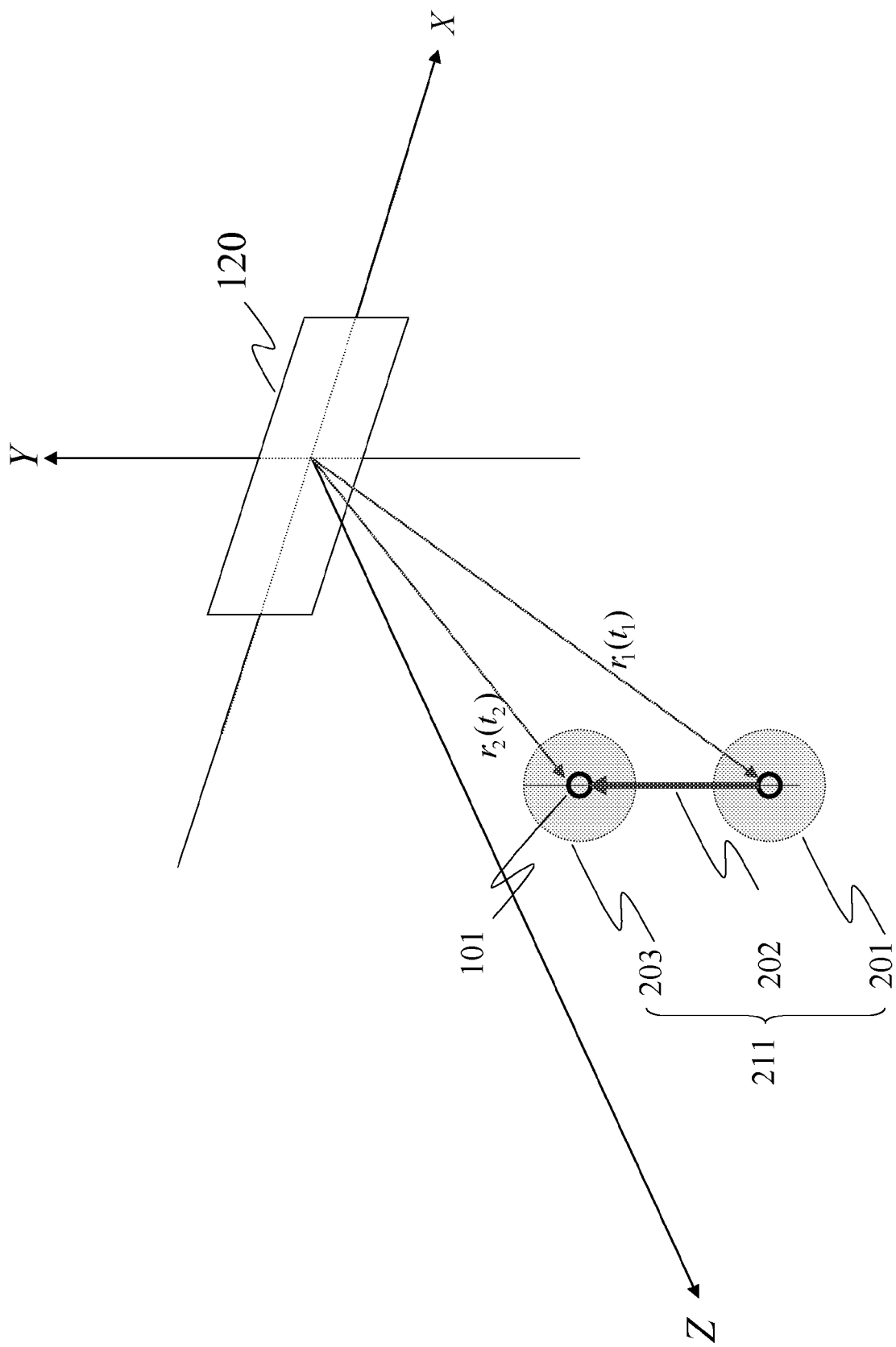
FIG. 11(b), shows the schematic view of a releasing button gesture used to emulate the mouse operation disclosed in the embodiment of the present invention.

As depicted in FIG. 11(b), the schematic view of a releasing button gesture used to emulate the mouse operation disclosed the embodiment of the present invention is shown. The releasing button gesture 211 can be defined as being composed of three consecutive physical states such as a temporary hold state 1 (201), a straight-line movement state 2 (202), and a temporary hold state 3 (203). The definition of the straight-line movement state 2 (202) stands for a short straight-line movement from the bottom to the top and satisfies a condition $|r_2(t_2)-r_1(t_1)|<\Delta L$ where $\Delta L$ is a variable and relatively small but larger-than-zero value.

Since the apparatus disclosed in the present invention has the capability of obtaining the 3D position coordinate of the spot light source device 101, in addition to the up-to-down or down-to-up movement, the moving direction can also be defined in other arbitrary directions such as forward-to-backward, backward-to-forward, right-to-left and left-to-right moving directions. Namely, there exists a movement relationship of reverse directions for the straight-line movement state 2 (202) in the gestures of the pressing button and the releasing button.

Figure 11C:
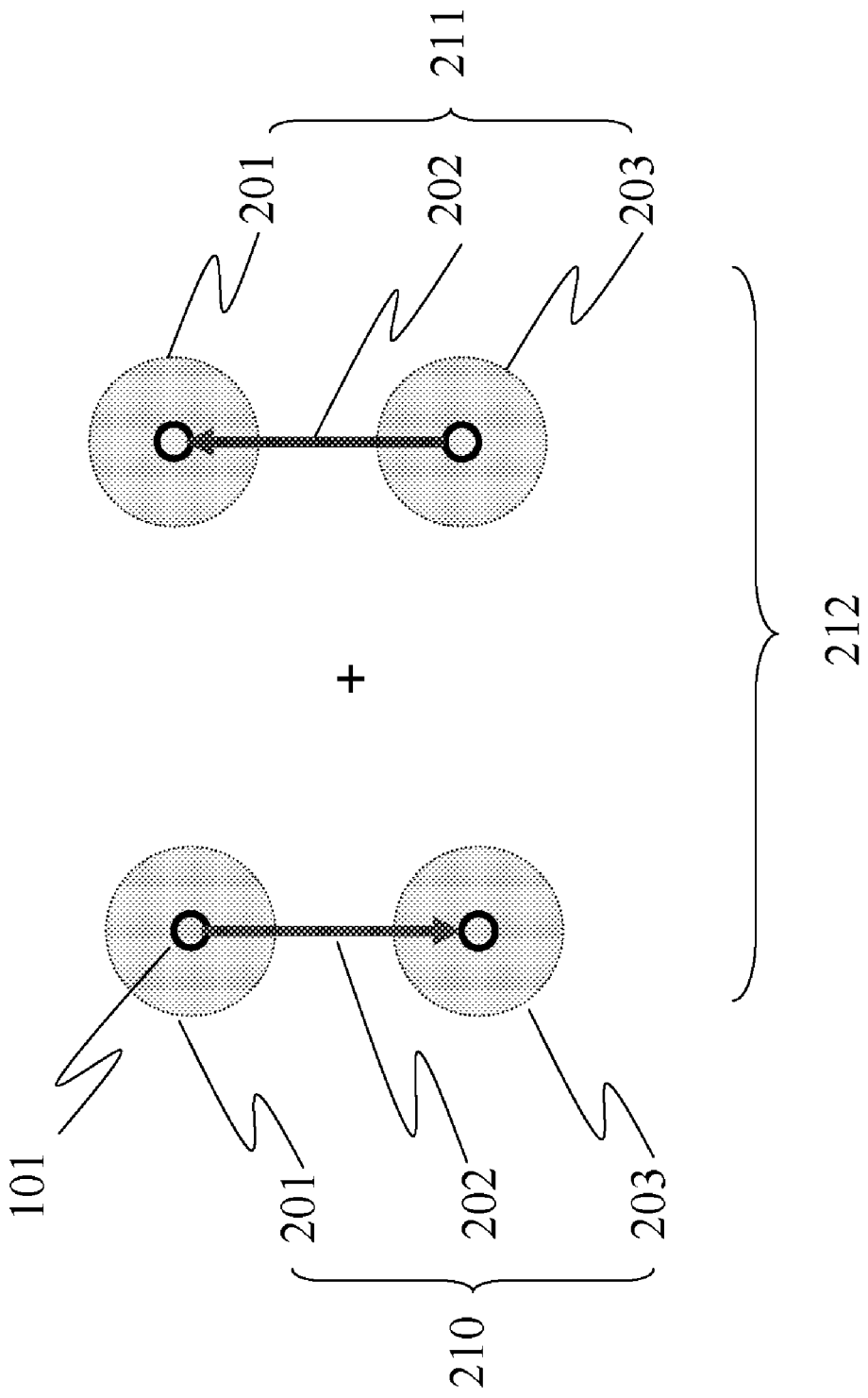
FIG. 11(c) shows the schematic view of a single clicking gesture used to emulate the mouse operation disclosed in the embodiment of the present invention.

As depicted in FIG. 11(c), the schematic view of a single clicking gesture used to emulate the mouse operation disclosed the embodiment of the present invention is shown. The single clicking gesture 212 can be composed of a pressing button gesture 210 and a releasing button gesture 211.

Figure 11D:
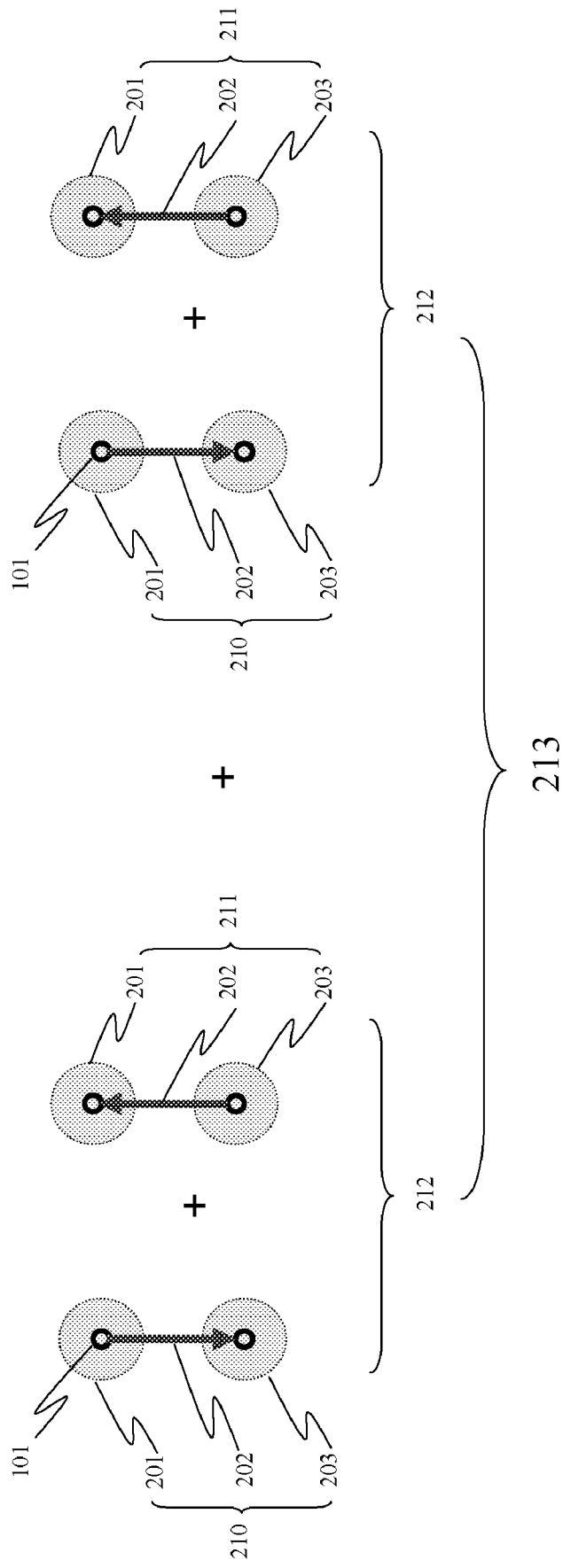
FIG. 11(d) shows the schematic view of a double clicking gesture used to emulate the mouse operation disclosed in the embodiment of the present invention.

As depicted in FIG. 11(d), the schematic view of a double clicking gesture used to emulate the mouse operation disclosed the embodiment of the present invention is shown. The double clicking gesture 213 can be composed of two single clicking gestures 212.

Figure 11E:
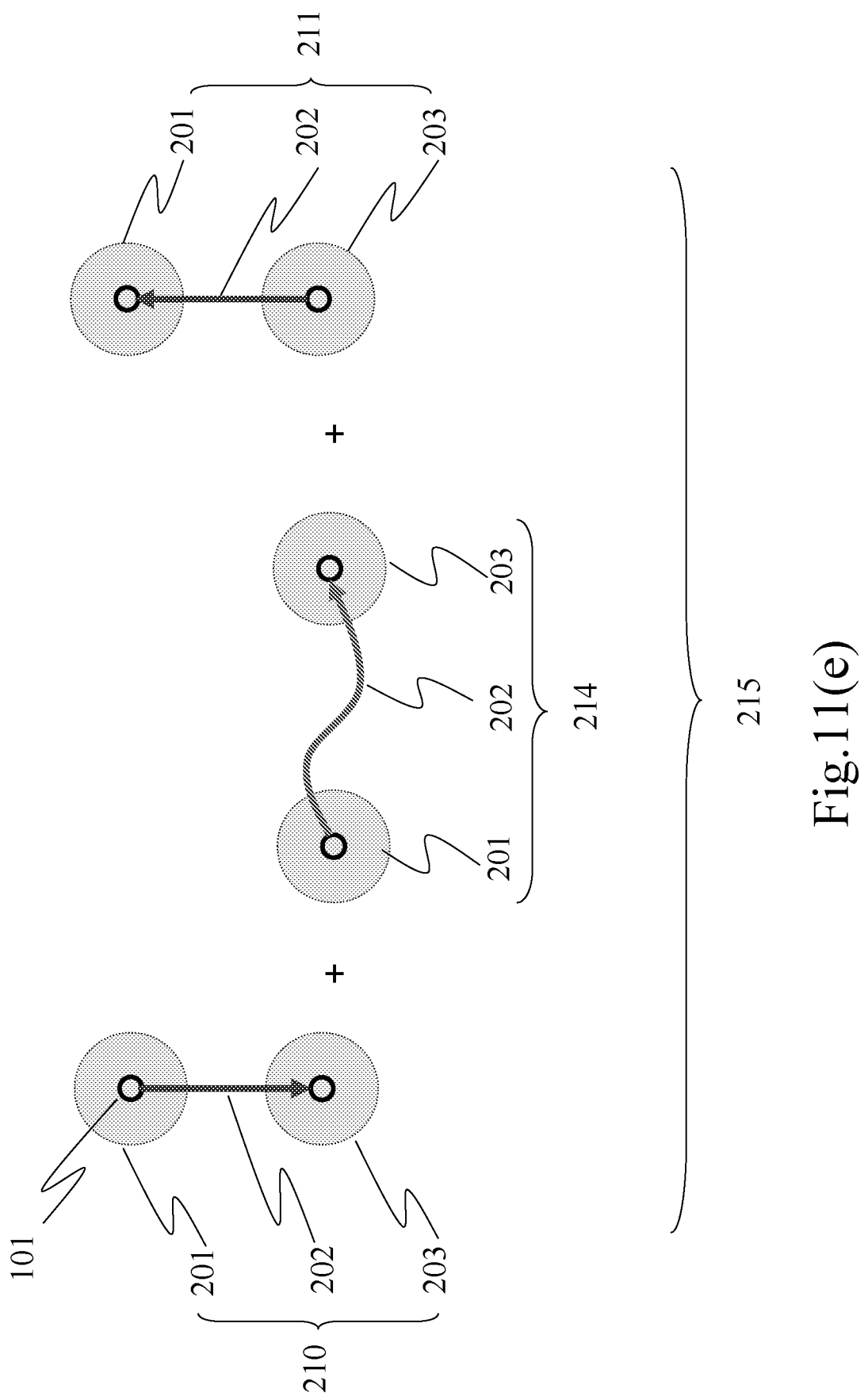
FIG. 11(e) shows the schematic view of a dragging gesture used to emulate the mouse operation disclosed in the embodiment of the present invention.

As depicted in FIG. 11(e), the schematic view of a dragging gesture used to emulate the mouse operation disclosed the embodiment of the present invention is shown. The dragging gesture 215 is composed of a pressing button gesture 210, an arbitrary gesture 214 other than the pressing button gesture 210 and the releasing button gesture 211, and a releasing button gesture 211.

The invention is disclosed as above, and it will be obvious that the same may be varied in many ways. Such variations are not to be regarded as a departure from the spirit and scope of the invention, and all such modifications obvious to one skilled in the art are intended to be included within the scope of the following claims.

I claim:

1. A three-dimensional (3D) mouse apparatus, comprising:
   a point light source device, mainly formed by a point light source for emitting a scattered light with arbitrary wavelength;
   a 3D gesture reading and recognizing device, consisting of three sets of 1D optical imaging device, for periodically receiving said scattered light and calculating, analyzing, recognizing and outputting a 3D gesture signal in a fixed time period; and
   an object point space, being a maximum space range provided for the movement of said point light source device;
   wherein said 3D gesture reading and recognizing device, comprises:
   three sets of 1D optical imaging device, for individually outputting an image pixel position signal $I_{s1}I_{s2}I_{s3}$ after receiving the scattered light of said point light source device, and for synchronously driving the scanning process of said three sets of 1D optical imaging device by receiving a synchronous control signal; and
   a gesture analysis device, for calculating, analyzing, recognizing and outputting a 3D gesture signal in a fixed time period after receiving the image pixel position signal $I_{s1}I_{s2}I_{s3}$ and for outputting a synchronous control signal, so as to synchronously drive the scanning process of said three sets of 1D optical imaging device;
   wherein said three sets of 1D optical imaging device, comprises:
   an optical filtering element, for receiving the scattered light of said point light source device, and emitting a scattered light after filtering the background light;
   a 1D optical lens module, composed of optical lens having 1D focusing capability, and the optical axis of said 1D optical lens module is disposed at $Z_j$ axis of image coordinate system, for transforming said scattered light into a stripe typed beam which is focused to form a line image on said 1D optical image sensor; and
   a 1D optical image sensor, composed of M×1 pixels with a pixel width $\Delta_w$, for receiving said line image and individually outputting the image pixel signal from the first pixel to the M-th pixel by analog voltage, wherein the center of said sensor is disposed at the origin of the image coordinate system and its longer axis is set parallel to the $Y_j$ axis of the image coordinate system;
   an image reading and processing device, being a microcomputer system, so as to achieve the purpose of said scanning process, and for outputting said image pixel position signal $I_{s1}I_{s2}I_{s3}$ which is analyzed and obtained by said image processing procedure after said image pixel signal is recorded in said memory, and for receiving a synchronous control signal which is used to synchronously driving said scanning process so that said image pixel signal can be fetched synchronously by said three sets of 1D optical imaging device.

2. The 3D mouse apparatus as set forth in claim 1, wherein said point light source device comprises:
   a battery, for supplying an electric power to an illuminating element and a power control circuit;

said illuminating element, composed of a plurality of semiconductor laser diodes or LEDs, for emitting a visible light or an invisible light;

said power control circuit, composed of an electronically controlled circuit and a switch, and connected to said battery and said illuminating element, for controlling the power supply of said battery and the brightness of said illuminating element;

an optical scattering element, composed of spherical lens with a short focus length, for receiving and focusing an emitting light from said illuminating element, so as to output a scattered light with a larger divergent angle;

a pin-hole element, composed of an optical element having an aperture which is disposed on the focal plane of said optical scattering element, for reducing the scattering light deviated from the focus point by changing the size of said aperture, so as to produce a scattering light source which is close to a point light source; and a mechanical device, for affixing said power control circuit, said battery, said illuminating element, said optical scattering element, and said pin-hole element.

3. The 3D mouse apparatus as set forth in claim 1, wherein said image pixel position signal $I_{s1}I_{s2}I_{s3}$, said synchronous control signal and said 3D gesture signal is transmitted by a wireless transmission or a cable.

4. The 3D mouse apparatus as set forth in claim 1, wherein said image processing procedure is Fourier image processing.

5. The 3D mouse apparatus as set forth in claim 1, wherein the image processing procedure of said image reading and processing device is used to eliminate the background light and analyze and obtain the brightest pixel position in the image pixel signal, wherein said brightest pixel position is the image pixel position signal $I_{s1}I_{s2}I_{s3}$.

6. The 3D mouse apparatus as set forth in claim 1, wherein said gesture analyzing device, comprises:

a microcomputer system, for periodically outputting a 3D gesture signal at an time interval which is calculated, analyzed and recognized by said error correction process and gesture analyzing process after receiving said three image pixel position signals $I_{s1}I_{s2}I_{s3}$, and for outputting a synchronous control signal so that said image pixel signals can be synchronously scanned and acquired by said three sets of 1D optical imaging device; and an interface, being a generic standard interface, for receiving and converting said 3D gesture signal to an electrical signal complying with said generic standard interface and outputting said 3D gesture signal.

7. The 3D mouse apparatus as set forth in claim 6, wherein said 3D gesture signal comprises a physical quantity signal and a gesture signal.

8. The 3D mouse apparatus as set forth in claim 7, wherein said physical quantity signal is the 3D position coordinate, displacement, velocity, and acceleration of said point light source device in object point space.

9. The 3D mouse apparatus as set forth in claim 7, wherein said gesture signal is composed of a plurality of consecutive gesture units, wherein said single gesture unit is composed of three consecutive physical states.

10. The 3D mouse apparatus as set forth in claim 9, wherein said temporary hold state is defined by maintaining a still state for said point light source device within the time frame of $t_1 \leq t \leq t_1+\Delta t_{hold}$, namely $|r_1(t)-r_1(t_1)|<\delta r$, where $\Delta t_{hold}$ δr are a variable and relatively small but larger-than-zero value.

11. The 3D mouse apparatus as set forth in claim 9, wherein said specific movement state is defined by that said point light source device moves from said state 1 to state 3 by a specific defined movement state within the time frame of $t_1+\Delta t_{hold}<t<t_2$, wherein said specific defined movement state can be a straight-line movement, or a curve movement, or a back-and-forth movement.

12. The 3D mouse apparatus as set forth in claim 9, wherein said temporary hold state 3 is defined by maintaining a still state for said point light source device within the time frame of $t_2 \leq t \leq t_2+\Delta t_{hold}$, namely, $|r_2(t)-r_2(t_2)|<\delta r$, where $\Delta t_{hold}$ δr are a variable and relatively small but larger-than-zero value.

13. The 3D mouse apparatus as set forth in claim 8, wherein said 3D position coordinate $(x_1, y_1, z_1)$ can be obtained by the following equations:

$$(y_{s1} \sin \theta - f \cos \theta)x_1 + (f \sin \theta + y_{s1} \cos \theta)z_1 = (-h \sin \theta + f) y_{s1} + hf \cos \theta;$$

$$fy_1 + y_{s2}z_1 = y_{s2}f;$$

$$(y_{s3} \sin \theta + f \cos \theta)x_1 + (f \sin \theta - y_{s3} \cos \theta)z_1 = (h \sin \theta - f) y_{s3} + hf \cos \theta;$$

wherein $$y_{s1}(I_{s1}-I_0) \times \omega;$$

$$y_{s2}(t_i) = (I_{s2}-I_0) \times \Delta \omega;$$

$$y_{s3}(I_{s3}-I_0) \times \Delta \Delta \omega;$$

14. The 3D mouse apparatus as set forth in claim 1, wherein the maximum space range for said object point space is defined by $(X_{min}, Y_{min}, Z_{min})$ and $(X_{max}, Y_{max}, Z_{max})$ and the center of said object point space is located at the convergent point $V(X_V, Y_V, Z_V)$.

15. The 3D mouse apparatus as set forth in claim 6, wherein said error correction process is a 3D interpolation correction process, and said process comprises:

a space division process, for dividing said object point space into equivalent sub-space as follows:

$X_i = \Delta Y \times i + X_{min}$, wherein $$\Delta X = \frac{X_{max} - X_{min}}{l},$$

l=integer, $0 \leq i < l$;
$Y_j = \Delta Y \times j + Y_{min}$, wherein $$\Delta Y = \frac{Y_{max} - Y_{min}}{m},$$

m=integer, $0 \leq j < m$;
$Z_k = \Delta Z \times k + Z_{min}$, wherein $$\Delta Z = \frac{Z_{max} - Z_{min}}{n},$$

n=integer, $0 \leq k < n$;

a calibration process, for measuring and recording error value by applying a coordinate measurement to said point light source device which is set at a known position $(X_i, Y_j, Z_k)$ in the object point space for obtaining the measured coordinate meas(i, j, k)=$(X_i \delta X_i, Y_j+\delta Y_j, Z_k+\delta Z_k)$, wherein $(\delta X_i, \delta Y_j, \delta Z_k)$ is the error value, and saving both measured coordinate meas(i, j, k) and error value ($\delta X_i, \delta Y_j, \delta Z_k$) in the memory;

a corresponding process, for corresponding the measured coordinate ($x_1, y_1, z_1$) of said point light source device in actual operation to a proper sub-space division according to following calculations:

$X_i + \delta X_i \leq x_1 < X_{i+1} + \delta X_{i+1}$;

$Y_j + \delta Y_j \leq y_1 < Y_{j+1} + \delta Y_{j+1}$;

$Z_k + \delta Z_k \leq z_1 < Z_{k+1} + \delta Z_{k+1}$;

an interpolation process, for obtaining the corrected coordinate ($X_1, Y_1, Z_1$) according to the value of meas(i, j, k) and err(i, j, k), and following calculations:

$$X_1 = X_i + \frac{\Delta X}{\Delta X + (\delta X_{i+1} - \delta X_i)} \times [x_1 - (X_i + \delta X_i)];$$

-continued $$Y_1 = Y_j + \frac{\Delta Y}{\Delta Y + (\delta Y_{j+1} - \delta Y_j)} \times [y_1 - (Y_j + \delta Y_j)];$$

and $$Z_1 = Z_k + \frac{\Delta Z}{\Delta Z + (\delta Z_{k+1} - \delta Z_k)} \times [z_1 - (Z_k + \delta Z_k)].$$

16. The 3D mouse apparatus as set forth in claim 6, wherein said generic standard interface is USB.

17. The 3D mouse apparatus as set forth in claim 6, wherein said time interval is the line scanning time interval or the integral times of line scanning time interval, wherein said line scanning time interval is the time frame for scanning and acquiring all image pixel signal of said 1D optical image sensor.

* * * * *